US010529372B2

(12) United States Patent
Okamoto et al.

(10) Patent No.: US 10,529,372 B2
(45) Date of Patent: Jan. 7, 2020

(54) DIGITAL INFORMATION RECORDING APPARATUS, REPRODUCING APPARATUS AND TRANSMITTING APPARATUS

(71) Applicant: Maxell, Ltd., Kyoto (JP)

(72) Inventors: Hiroo Okamoto, Yokohama (JP);
Hitoaki Owashi, Yokohama (JP);
Atsushi Yoshioka, Ebina (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 15/690,640

(22) Filed: Aug. 30, 2017

(65) Prior Publication Data

US 2017/0365292 A1    Dec. 21, 2017

Related U.S. Application Data

(63) Continuation of application No. 14/713,515, filed on May 15, 2015, now Pat. No. 9,773,522, which is a
(Continued)

(30) Foreign Application Priority Data

Dec. 13, 2000  (JP) ................................ 2000-384891
Dec. 21, 2000  (JP) ................................ 2000-393271
Jan. 10, 2001  (JP) ................................ 2001-002053

(51) Int. Cl.
*H04N 21/00*   (2011.01)
*H04N 21/20*   (2011.01)
(Continued)

(52) U.S. Cl.
CPC ........ *G11B 20/00688* (2013.01); *G11B 19/06* (2013.01); *G11B 19/122* (2013.01);
(Continued)

(58) Field of Classification Search
USPC ........................................ 386/239, 248, 252
See application file for complete search history.

(56) References Cited

U.S. PATENT DOCUMENTS 4,086,619 A    4/1978  Miyake et al.
4,970,663 A    11/1990 Bedell
(Continued)

FOREIGN PATENT DOCUMENTS

CA    2321522         9/1999
EP    1058257 A1      12/2000
(Continued)

OTHER PUBLICATIONS

Japanese Office Action dated Jan. 30, 2007.
(Continued)

*Primary Examiner* — Daquan Zhao
(74) *Attorney, Agent, or Firm* — Mattingly & Malur, PC

(57) ABSTRACT

A digital information recording apparatus includes a recording circuit for recording information of a retention period included in the digital information and indicating a period for permitting the digital information to be held in the recording medium, starting with a time at which the digital information is recorded on the recording medium; and information of a playback permission period included in the digital information and indicating a period for permitting the digital information to be played back starting with a time at which the information is reproduced initially following recording of the digital information on the recording medium, permitting temporary recording or copying for the information permitted for "copy never" or "copy one generation."

45 Claims, 10 Drawing Sheets

Related U.S. Application Data continuation of application No. 13/649,882, filed on Oct. 11, 2012, now Pat. No. 9,083,942, which is a continuation of application No. 11/834,350, filed on Aug. 6, 2007, now Pat. No. 8,311,389, which is a continuation of application No. 09/982,291, filed on Oct. 19, 2001, now abandoned.

(51) Int. Cl.
| | | |
|---|---|---|
| G11B 20/00 | (2006.01) | |
| G11B 20/10 | (2006.01) | |
| G11B 19/06 | (2006.01) | |
| G11B 19/12 | (2006.01) | |
| H04N 5/76 | (2006.01) | |
| H04N 21/254 | (2011.01) | |
| H04N 21/432 | (2011.01) | |
| H04N 21/433 | (2011.01) | |
| H04N 21/442 | (2011.01) | |
| H04N 21/454 | (2011.01) | |
| H04N 21/4627 | (2011.01) | |
| H04N 21/8355 | (2011.01) | |
| H04N 5/913 | (2006.01) | |
| H04N 21/23 | (2011.01) | |
| H04N 21/458 | (2011.01) | |

(52) U.S. Cl.
CPC .. *G11B 20/00166* (2013.01); *G11B 20/10527* (2013.01); *H04N 5/76* (2013.01); *H04N 5/913* (2013.01); *H04N 21/2541* (2013.01); *H04N 21/4325* (2013.01); *H04N 21/4334* (2013.01); *H04N 21/44204* (2013.01); *H04N 21/4542* (2013.01); *H04N 21/4627* (2013.01); *H04N 21/8355* (2013.01); *G11B 2020/10537* (2013.01); *H04N 2005/91314* (2013.01); *H04N 2005/91328* (2013.01); *H04N 2005/91335* (2013.01); *H04N 2005/91364* (2013.01)

(56) References Cited

U.S. PATENT DOCUMENTS

| | | |
|---|---|---|
| 5,023,741 A | 6/1991 | Conti et al. |
| 5,400,402 A | 3/1995 | Garfinkle |
| 5,442,744 A | 8/1995 | Piech et al. |
| 5,555,441 A | 9/1996 | Haddad |
| 5,616,876 A | 4/1997 | Cluts |
| 5,629,980 A | 5/1997 | Stefik et al. |
| 5,638,443 A | 6/1997 | Stefik et al. |
| 5,654,746 A | 8/1997 | McMullan et al. |
| 5,699,370 A | 12/1997 | Kaniwa et al. |
| 5,704,051 A | 12/1997 | Lane et al. |
| 5,715,403 A | 2/1998 | Stefik |
| 5,734,823 A | 3/1998 | Saigh et al. |
| 5,751,282 A | 5/1998 | Girard et al. |
| 5,758,068 A | 5/1998 | Brandt et al. |
| 5,796,828 A | 8/1998 | Tsukamoto et al. |
| 5,825,876 A | 10/1998 | Peterson, Jr. |
| 5,884,056 A | 3/1999 | Steele |
| 5,896,454 A | 4/1999 | Cookson et al. |
| 6,005,579 A | 12/1999 | Sugiyama et al. |
| 6,020,930 A | 2/2000 | Legrand |
| 6,025,868 A | 2/2000 | Russo |
| 6,034,832 A | 3/2000 | Ichimura et al. |
| 6,166,735 A | 12/2000 | Dom et al. |
| 6,175,362 B1 | 1/2001 | Harms et al. |
| 6,219,837 B1 | 4/2001 | Yeo et al. |
| 6,236,971 B1 | 5/2001 | Stefik et al. |
| 6,243,725 B1 | 6/2001 | Hempleman et al. |
| 6,278,836 B1 | 8/2001 | Kawara et al. |
| 6,396,998 B1 | 5/2002 | Nozaki et al. |
| 6,400,378 B1 | 6/2002 | Snook |
| 6,434,322 B1 | 8/2002 | Kimura et al. |
| 6,456,334 B1 | 9/2002 | Duhault |
| 6,477,320 B1 | 11/2002 | Asada et al. |
| 6,490,113 B2 | 12/2002 | Sugiyama et al. |
| 6,553,178 B2 | 4/2003 | Abecassis |
| 6,584,552 B1 | 6/2003 | Kuno et al. |
| 6,611,813 B1 | 8/2003 | Bratton |
| 6,646,655 B1 | 11/2003 | Brandt et al. |
| 6,707,774 B1 | 3/2004 | Kuroda et al. |
| 6,724,403 B1 | 4/2004 | Santoro et al. |
| 6,734,909 B1 | 5/2004 | Terane et al. |
| 6,754,548 B1 | 6/2004 | Yoshii et al. |
| 6,771,885 B1 | 8/2004 | Agnihotri et al. |
| 6,834,349 B1 | 12/2004 | Higurashi et al. |
| 6,836,844 B1 | 12/2004 | Kori et al. |
| 6,850,619 B1 * | 2/2005 | Hirai ............... H04N 5/913 380/201 |
| 6,868,494 B1 | 3/2005 | Shitara et al. |
| 6,882,793 B1 | 4/2005 | Fu et al. |
| 6,934,964 B1 | 8/2005 | Schaffer et al. |
| 7,054,547 B1 | 5/2006 | Abecassis |
| 7,127,744 B2 | 10/2006 | Levy |
| 7,231,360 B2 | 6/2007 | Sy |
| 7,249,106 B1 | 7/2007 | Tanabe et al. |
| 7,443,418 B2 | 10/2008 | Bryant et al. |
| 7,487,552 B2 | 2/2009 | Sako et al. |
| 7,565,675 B2 | 7/2009 | Sincaglia et al. |
| 8,291,444 B1 | 10/2012 | Newell et al. |
| 2001/0009007 A1 | 7/2001 | Miyamae et al. |
| 2001/0013120 A1 | 8/2001 | Tsukamoto |
| 2001/0037379 A1 | 11/2001 | Livnat |
| 2001/0052127 A1 | 12/2001 | Seo et al. |
| 2001/0056434 A1 | 12/2001 | Kaplan et al. |
| 2002/0049979 A1 | 4/2002 | White et al. |
| 2002/0056098 A1 | 5/2002 | White |
| 2002/0069418 A1 | 6/2002 | Phillips |
| 2002/0152381 A1 | 10/2002 | Kuriya et al. |
| 2002/0166122 A1 | 11/2002 | Kikinis et al. |
| 2003/0088646 A1 | 5/2003 | Yeo |
| 2003/0093790 A1 | 5/2003 | Logan et al. |
| 2003/0101861 A1 | 6/2003 | Taira et al. |
| 2003/0122861 A1 | 7/2003 | Jun et al. |
| 2003/0149988 A1 | 8/2003 | Ellis et al. |
| 2004/0068606 A1 | 4/2004 | Kim et al. |
| 2004/0078383 A1 | 4/2004 | Mercer et al. |
| 2005/0193416 A1 | 9/2005 | Przybylek |
| 2006/0047978 A1 | 3/2006 | Kawakami et al. |
| 2006/0107289 A1 | 5/2006 | Deyonker et al. |
| 2006/0168147 A1 | 7/2006 | Inoue et al. |
| 2007/0220580 A1 | 9/2007 | Putterman et al. |

FOREIGN PATENT DOCUMENTS

| | | |
|---|---|---|
| JP | 01166218 A | 6/1989 |
| JP | 610501 Y2 | 3/1994 |
| JP | 07230667 A | 8/1995 |
| JP | 08023315 A | 1/1996 |
| JP | 08076994 A | 3/1996 |
| JP | 2543142 B2 | 7/1996 |
| JP | 08203246 A | 8/1996 |
| JP | 08263439 A | 10/1996 |
| JP | 09044994 A | 2/1997 |
| JP | 9055025 | 2/1997 |
| JP | 09191453 | 7/1997 |
| JP | 10162559 | 6/1998 |
| JP | 11025597 | 1/1999 |
| JP | 11146378 | 5/1999 |
| JP | 11155125 A | 6/1999 |
| JP | 11250569 A | 9/1999 |
| JP | 11259964 A | 9/1999 |
| JP | 11283327 A | 10/1999 |
| JP | 11-341441 A | 12/1999 |
| JP | 2000-047867 A | 2/2000 |
| JP | 2000078515 A | 3/2000 |
| JP | 2000149417 | 5/2000 |
| JP | 2000149419 A | 5/2000 |
| JP | 2000182333 A | 6/2000 |
| JP | 2000207831 A | 7/2000 |
| JP | 3114339 B2 | 9/2000 |
| JP | 2000244726 A | 9/2000 |

(56) References Cited

FOREIGN PATENT DOCUMENTS

| | | |
|---|---|---|
| JP | 2000268496 A | 9/2000 |
| JP | 2000298926 A | 10/2000 |
| JP | 2000305846 A | 11/2000 |
| JP | 2000322826 A | 11/2000 |
| JP | 2000330870 A | 11/2000 |
| JP | 2000333141 A | 11/2000 |
| JP | 2002-82918 A | 3/2002 |
| JP | 2002-184114 A | 6/2002 |
| JP | 2007-335073 A | 12/2007 |
| WO | 1997/025798 A1 | 7/1997 |
| WO | 1999/048296 A1 | 9/1999 |

OTHER PUBLICATIONS

Japanese Office Action issued in correSponding Japanese Patent Application No. 2007-324173 dated Sep. 24, 2008.

Office Action dated Jun. 12, 2012 in connection with JApanese Patent Application No. 2011-253441.

Fandango's Invalidity Contentions which were filed Mar. 26, 2018 in the following litigation: *Maxell, Ltd.* v. *Fandango Media, LLC*, Civil Action No. 2:17-cv-07534 (C.D. California, filed Oct. 13, 2017.

LG Electronics U.S.A., "Installation and Operating Guide | Warranty Model No. DVR413 | DVD Recorder", May 13, 2004, pp. 1-64.

Pollack, W., "Tuning in: The Future of Copyright Protection for Online Music in the Digital Medium", Fordham Law Review, May 2000, pp. 2445-2488, vol. 68, Issue 6.

Ponceleon, D. et al., "Key to Effective Video Retrieval: Effective Cataloging and Browsing", 1998, pp. 99-107, ACM Multimedia.

Wactlar, H. D et al., "Lessons Learned from building a Terabyte Digital Video Library", Feb. 1999, pp. 66-73.

Srinivasan, S. et al., ""What is in that Video Anyway?": In Search of Better Browsing", 1999, pp. 388-393.

Civil Minutes of Order Regarding Defendant's Motion for Judgement on the Pleadings dated Sep. 11, 2018 in the following Litigation: *Maxell, Ltd.* v. *Fandango Media, LLC*, Civil Action No. 2:17-cv-07534 (C.D.) California, filed Oct. 13, 2017.

Judgment dated Oct. 8, 2019 in the following Litigation: *Maxell, Ltd.* v. *Fandango Media, LLC*, U.S. Court of Appeals for the Federal Circuit, Appeal No. 2019-1088, Decided Oct. 8, 2019.

\* cited by examiner

FIG.8

| PROGRAM NUMBER | SECTOR INFORMATION | TIME INFORMATION | TYPE INFORMATION | COPY CONTROL INFORMATION | RECORDING TIME | RETENTION PERIOD | COPY PERMISSION PERIOD | PLAYBACK PERMISSION PERIOD | MOVE PERMISSION PERIOD | USER IDENTIFICATION INFORMATION | ENCRYPTION INFORMATION |
|---|---|---|---|---|---|---|---|---|---|---|---|
| 300 | 301 | 302 | 303 | 304 | 305 | 306A | 306B | 307A | 307B | 308 | 309 |

FIG.9

| VERSION NUMBER | OUTPUT CONTROL | CGMS | APS | MOVE MODE | PLAYBACK COUNT | PLAYBACK LONGEVITY PERIOD | PAUSE PERIOD | DELAYED START TIME |
|---|---|---|---|---|---|---|---|---|
| 311 | 312 | 313 | 314 | 315 | 316 | 317 | 318 | 319 |

FIG.10

| PROGRAM NUMBER | PLAYBACK START TIME 1 | PLAYBACK START SECTOR NUMBER 1 | PLAYBACK STOP SECTOR NUMBER 1 | PLAYBACK START TIME 2 | PLAYBACK START SECTOR NUMBER 2 | PLAYBACK STOP SECTOR NUMBER 2 | ... |
|---|---|---|---|---|---|---|---|
| 300 | 321 | 322 | 323 | 321 | 322 | 323 | |

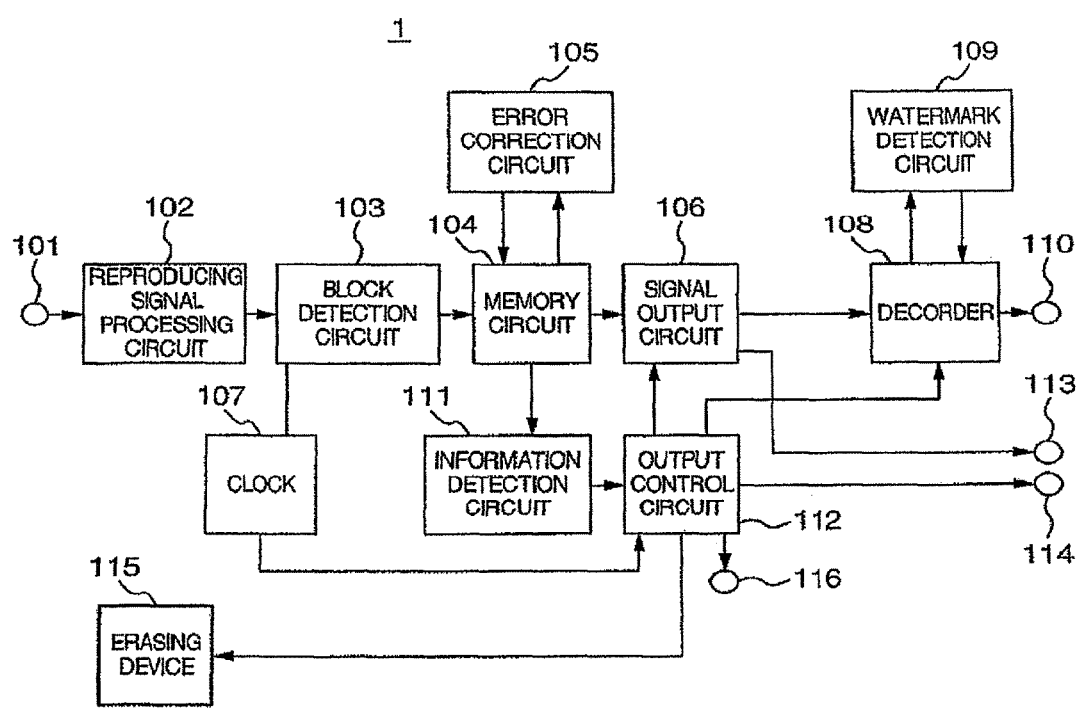

DIGITAL INFORMATION RECORDING APPARATUS, REPRODUCING APPARATUS AND TRANSMITTING APPARATUS

CROSS REFERENCE TO RELATED APPLICATION

This application is a Continuation of U.S. application Ser. No. 14/713,515, filed May 15, 2015, which is a Continuation of U.S. application Ser. No. 13/649,882, filed Oct. 11, 2012, now U.S. Pat. No. 9,083,942, issued Jul. 14, 2015, which is a Continuation of U.S. application Ser. No. 11/834,340, filed Aug. 6, 2007, now U.S. Pat. No. 8,311,389, issued Nov. 13, 2012, which is a Continuation of U.S. application Ser. No. 09/982,291, filed Oct. 19, 2001, which claims priority from Japanese patent applications JP 2001-002053, filed Jan. 10, 2001, JP 2000-384891, filed on Dec. 13, 2001 and JP 2000-393271, filed Dec. 21, 2000, the contents of which are incorporated by references.

BACKGROUND OF THE INVENTION

Field of the Invention

The present invention relates to an apparatus for recording or reproducing digital information such as video and audio data, more particularly, to digital information recording and reproducing apparatus capable of setting a limit to playback or copying of the information to be recorded or reproduced by the authority of copyright holders and the like. Further, the present invention relates to a transmitting apparatus suitable for transmitting digital information to the recording and reproducing apparatus as above.

Description of the Related Art

Digital television broadcasting has been started and digital recording and reproducing apparatus for recording and reproducing digital information have been brought to market. In addition, even in the field of package medium such as movie software, package software to be used with this type of apparatus will be developed and practiced in the near future.

The digital recording scheme has an advantage that the quality is not deteriorated or very less degraded in the recording and reproducing process. But in the event that many high-quality copies are prepared and circulated at a site unknown to a copyright holder, there arises a problem that profits cannot be returned to the copyrighters. This is a pending problem for which countermeasures have been discussed in various fields since a case of digital audio tape deck at issue.

For example, JP-A-11-146378 discloses a method of preventing preparation of high-quality copies by degrading the quality in advance of digitally recording information.

U.S. Pat. No. 5,896,454 discloses a method of adding copy control information of 2 bits to data information. In the method, any one of copy inhibition, copy approval and copy approval for only one generation is selected of volition of copyright holders or information planners to control the operation of a recording apparatus. The recording apparatus does not perform recording operation if copy inhibition is selected but performs recording operation if copy approval is selected. With copy approval for only one generation selected, the recording apparatus rewrites this control information into information for inhibiting any more copies and then operates to record.

In other words, the copy control information useful for the information data planner to control copying operation by users has been proposed. For example, codes of "copy never" (copy inhibition), "copy one generation" (for permitting only one copy), "no more copies" (data once copied through "copy one generation" is not permitted for more copies) and "copy free" (approval of copying) are set in a header part of data or a watermark (WM), very difficult to detect, is embedded in an image. The above expedient is expected to solve the problem without inflicting a one-sided loss on the copyright holders or users.

But, even in case the stringent inhibition, for example, "copy never" is imposed, there is obviously a spontaneous need for temporarily recording information on, for example, a hard disc of a receiving apparatus and playing back the information and therefore, with a view of mitigating a loss on the side of users, a means for this purpose is necessary. At that time, it must also be considered to mitigate a loss on the side of copyright holders.

More particularly, when a visitor comes accidentally while the copy control information being set to "copy never" in broadcasting, a user in question disadvantageously looses a chance of playing back a broadcast program. Under the circumstances, JP-A-2000-149417 discloses a method of eliminating such a problem by using a means "temporary recording" even when the copy control information designates "copy never". According to the method, information is once recorded physically on a recording medium and a limit of 90 minutes for instance is set to the period for reproduction and playback and the information is erased after a playback or at the termination of the period. In other words, the recording is not for long-term conservation and multipurpose utilization but simply permits the broadcasting to be equivalently played back 90 minutes later. Since the information on the recording medium does not remain for a long time, the aforementioned inconvenience of users can be eliminated without inflicting an unprofitableness to the copyright holders. The temporary recording is, because of its nature, carried out frequently by using a hard disc recorder built in the receiving apparatus.

SUMMARY OF THE INVENTION

Various kinds of expedience disclosed in the above documents give a solution to the problems. But the problem involved in copyright cannot be solved satisfactorily by the conventional methods that inflict one-sided profit or loss to copyright holders, broadcasting or software developing firms or general users.

Further, the "copy one generation" conveniently gives the users a chance of backing up the information recorded temporarily on a hard disc for instance. As a rule, once the temporarily recorded information is copied, the copy control information changes to "no more copies" to prevent any more copying. But, when copying of the temporarily recorded information is permitted, though only once, the copy permission remains for a long time, giving anxiety to the copyright holders. On the other hand, when "no more copies" is once set, desired exchange of the medium storing the contents becomes impossible and disadvantageously the users are forced to suffer from inconvenience.

In the light of the above problems, an object of the present invention is to provide more specifically a unit for preventing circulation of unauthorized copies and permitting the user to perform conditional playback and the like.

Another object of the invention is to provide a unit for eliminating the aforementioned anxiety of the copyright holders and inconvenience of the users through a method of meeting the compatibility between profits of the user and the copyright holder.

Still another object of the invention is to provide a unit for limiting a condition for permitting playback of recorded information for instance so as to enable the copyright holder to further control the range of information utilization.

According to the invention, the effective period, available inside a recording medium, of information permitted for temporary recording is prescribed. The apparatus has a unit for disabling reproduction and playback after expiration of a prescribed time following recording initiation. Through this, the information temporarily recorded on the medium can be prevented from being used later for unauthorized purposes. The effective period inside the recording medium referred to herein will be called "retention period". Further, the effective period starting with playback initiation is also prescribed. The apparatus has a unit for disabling repetitive reproduction and playback after expiration of a prescribed time following the initial start of playback. Through this, playback by many and unspecified users can be prevented. The effective period referred to herein will be called "playback permission period". Frequently, the retention period is set to be equal to or longer than the playback permission period but this is not limitative. Many types of reproducing apparatus cause their operation to temporarily pause or stop during reproduction. Accordingly, even when reproduction is started during the playback permission period, the retention period sometimes happens to stop or end before the playback comes to an end. In that case, concurrently with the stop of the retention period, reproduction is disabled to proceed any more. Alternatively, for convenience of users, even with the retention period stopped, a part of information succeeding the stopping location is once allowed for continuous playback up to the end. In that case, conditionally, further pause and stop are inhibited.

In some case, a part once subjected to playback is inhibited for repetitive playback. This can be implemented by disabling backward feed of the medium or making, in some way, a part once subjected to playback non-reproducible during backward feed.

When the copyright holder originally sets a limit to copying such as "copy one generation" for instance, copying permitted for the user is limited to some extent. To prevent the temporarily recorded information from staying in the medium for a long time while being conditioned to "copy one generation", the present invention prescribes the effective period for the information, conditioned to "copy one generation" to stay in the recording medium following, recording of the information. The apparatus has a unit for handling the information as being subject to "no more copies" after expiration of the prescribed period following recording so as to prevent copying, thereby eliminating anxiety of the copyright holder about the long-term stay of the information subject to "copy one generation". The effective period referred to herein will be called "copy permission period". In the medium in which the copy permission period has expired or information is copied within the copy permission period, the copy control information changes to "no more copies" to disable copying.

In that case, by permitting "move" operation for moving the information to another medium on the presupposition that the original information is to be erased, inconvenience of the user can be obviated. As necessary, the period for permitting the move mode after the control information has changed to "no more copies" or the period for permitting repetitive move after the preceding move may be prescribed. The effective period referred to herein will be called "move permission period".

When the operation is caused to temporarily pause or stop during reproduction even if copying is started during the copy permission period, the move permission period will sometimes be stopped before it comes to an end. In that case, concurrently with the stoppage of the copy permission period, any more copying is inhibited. Alternatively, for convenience of the user, even with the copy permission period stopped, a part succeeding the stop location can once be allowed for continuous copying up to the end. In that case, conditionally, further pause and stop are inhibited.

BRIEF DESCRIPTION OF THE DRAWINGS

These and other objects, features and advantages of the present invention will become more readily apparent from the following detailed description when taken in conjunction with the accompanying drawings wherein:

FIG. 8 is a diagram showing an embodiment of the structure of first control information according to the invention;

FIG. 9 is a diagram showing an embodiment of the structure of copy control information according to the invention;

FIG. 10 is a diagram showing an embodiment of the structure of second control information according to the invention;

FIG. 15 is a block diagram showing an embodiment of an erasing circuit in the digital information reproducing apparatus according to the invention.

DETAILED DESCRIPTION OF THE EMBODIMENTS

Figure 1:
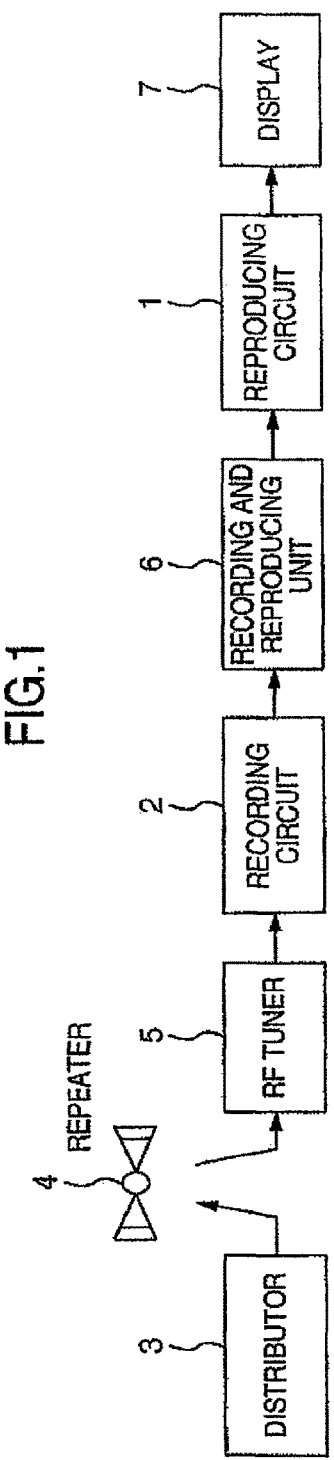
FIG. 1 is a block diagram showing an embodiment of the configuration of the whole of a digital information transmitting, receiving, recording and reproducing system to which digital information recording apparatus, reproducing apparatus and transmitting apparatus according to the invention are applied.

FIG. 1 is a block diagram showing an overall configuration of a transmitting, receiving, recording and reproducing system including an information distributor. The present invention involves a recording apparatus, a reproducing apparatus and a transmitting apparatus, having a reproducing circuit 1, a recording circuit 2, an information distributor 3 such as a broadcasting station, a repeater 4, a tuner for RF (radio frequency) 5, a recording/reproducing unit 6 and a display 7.

The information distributor 3 such as a broadcasting station transmits a signal electromagnetic wave modulated with information through the medium of the repeater 4 such as, for example, a broadcasting satellite. Otherwise, transmission based on a cable may be employed. The RF tuner 5 on the receiving side receives and demodulates the transmitted information and thereafter, the recording circuit 2 converts it into a signal suitable for recording on a recording medium and the recording/reproducing unit 6 records the converted signal. The recording/reproducing unit 6 also reproduces the information from the recording medium. A reproduction signal is applied to the display 7 through the reproducing circuit 1 to ensure playback of the information representing original video and audio data. Though not illustrated, the received information can also be played back directly. In case information recorded in advance on a removable recording medium is serviced, only the operation succeeding the reproducing operation by the recording/reproducing unit 6 is carried out.

Figure 2:
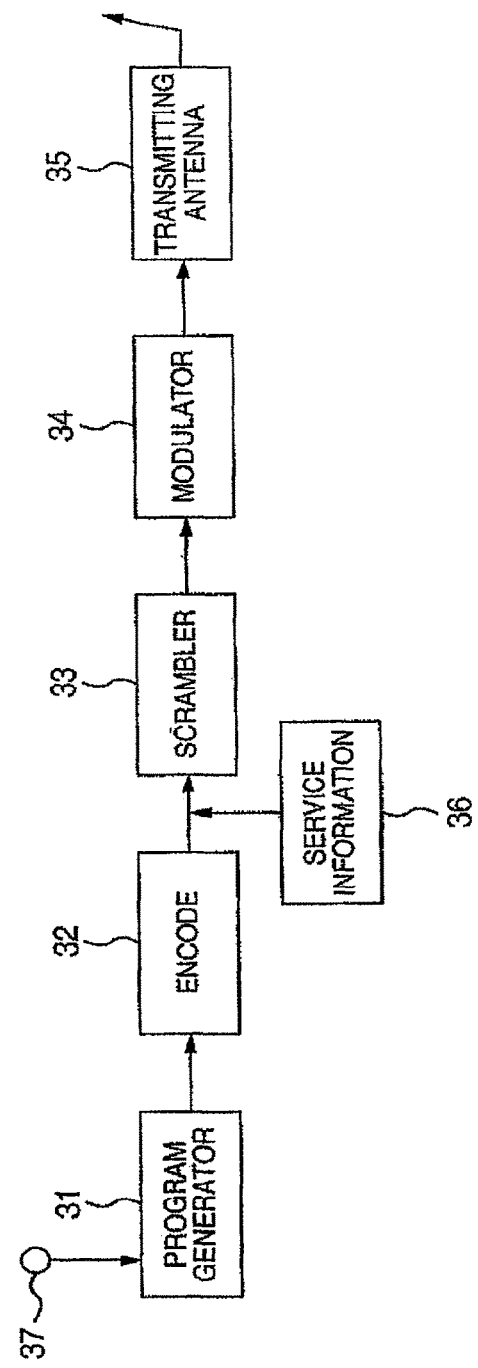
FIG. 2 is a block diagram showing an embodiment of the digital information transmitting apparatus according to the invention.

FIG. 2 is a block diagram showing an embodiment of the construction of the information distributor 3 (transmitting apparatus) such as a broadcasting station. The transmitting apparatus comprises a program generator 31, an encode circuit 32 for performing compression based on, for example, MPEG scheme, a scrambler circuit 33, a modulator circuit 34, a transmitting antenna 35, a service information applying circuit 36 and an input terminal 37.

The amount of data in information such as video/audio information generated by the program generator 31 constituted of a camera or recording/reproducing device is compressed by the encode circuit 32 so that the information may be transmitted with a less bandwidth. As necessary, the information is encrypted by means of the scrambler circuit 33 to enable a specified audience to take part in playback. The encrypted information is modulated to a signal suitable for transmission by means of the modulator circuit 34 and then is emitted from the transmitting antenna 35 in the form of an electric wave directed to the repeater such as, for example, a broadcasting satellite. In this phase, the service information applying circuit 36 adds information such as copy control information and retention information and playback/copy permission period information. In addition to the above information, the present time information may be applied which can be utilized as a start point of the retention period and copy permission period. For example, request information is inputted to the input terminal 37 through a telephone line for instance. This is utilized for the case where the information to be transmitted is determined in response to a request from audiences as exemplified by video-on-demand.

Figure 3:
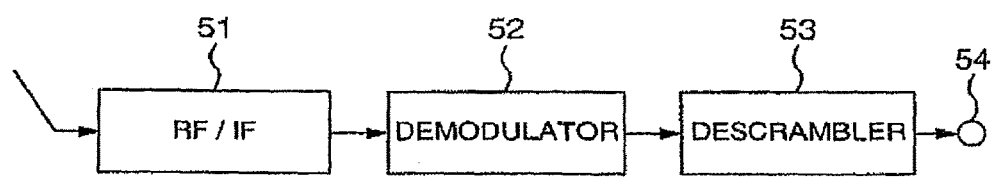
FIG. 3 is a block diagram of a digital information receiving side in FIG. 1.

FIG. 3 is a block diagram showing an embodiment of the RF tuner 5 shown in FIG. 1. The RF tuner 5 includes an RF/IF converter circuit 51, a demodulator circuit 52, a descrambler circuit 53 for decoding or decrypting the cipher applied to the signal and an output terminal 54.

An electric field from the repeater, for example, a broadcasting satellite is inputted to the RF/IF converter circuit 51. The RF-band electric wave is converted in frequency to a frequency of IF (intermediate frequency) band or is converted into a signal of a constant band independent of a receiving channel. The demodulator circuit 52 releases the modulation operation applied for the purpose of transmission. The cipher in the demodulated signal is then decrypted by the descrambler circuit 53 and then delivered to the output terminal 54.

Figure 4:
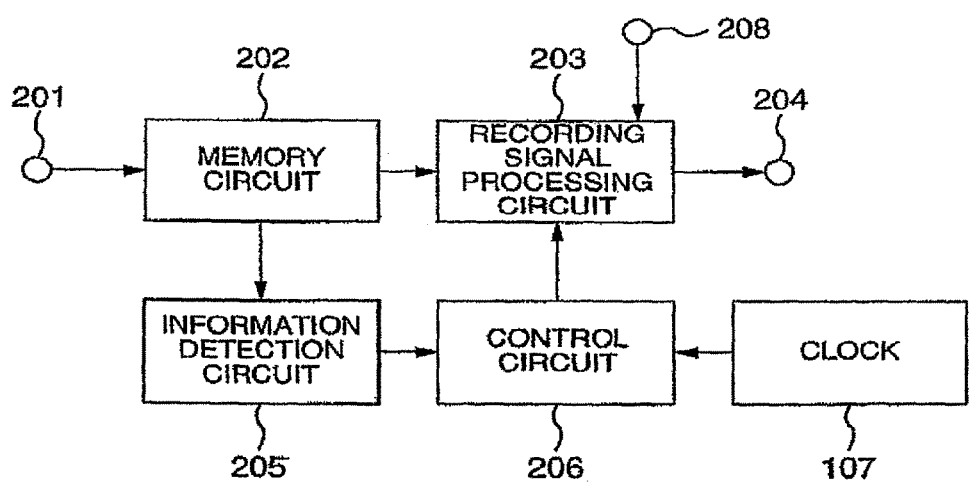
FIG. 4 is a block diagram showing an embodiment of a recording circuit in the digital information recording apparatus according to the invention.

FIG. 4 is a block diagram showing an embodiment of the recording circuit 2. The recording circuit 2 has an input terminal 201 for a signal to be recorded, a memory circuit 202 such as a semiconductor memory, a recording signal processing circuit 203, an output terminal 204 for a signal to be recorded on a recording medium, an information detection circuit 205, a recording control circuit 206, a clock 107 and an input terminal 208 for records of a control signal during reproduction.

The signal inputted through the input terminal 201 is applied with various control codes. As an example, a signal applied with the copy information "copy never" and designated with the aforementioned retention period and playback permission period will be described. In the case of broadcasting, the data as above is applied to the information by means of, for example, the service information applying circuit 36 of FIG. 2. The inputted data is once stored block by block in the memory circuit 202. Then, the data is fed to the information detection circuit 205 which in turn detects the control information concerning copying. Subsequently, the recording control circuit 206 decides on the basis of the data as above whether the signal is permitted for recording and sends a decision result to the recording signal processing circuit 203. The recording signal processing circuit 203 has already been applied with the data from the memory circuit 202 and on the basis of the control signal from the recording control circuit 206, it interrupts the signal when recording is inhibited but applies a modulation suitable for the medium used when recording is permitted, thus delivering a modulated signal to the output terminal 204. The output signal is recorded on a medium such as a tape or disc. For example, even when the control information is "copy never", the output signal is recorded temporarily on the medium if the effective retention period and playback permission period are designated. Obviously, instead of being detected by the information detection circuit 205, the control signal may be applied externally, separately from video/audio data.

When recording is permissible, the information including the copy control information and the retention period and playback permission period is generated by the recording control circuit 206 and is added to the recording signal by means of the recording signal processing circuit 203. As necessary, the present time during recording delivered out of the clock 107 is also recorded concurrently. If the present time is included in the received information, this data may be used or the clock 107 may be set by the received information. Through this, the present time during recording can be prevented from being altered.

With the aforementioned control information being "copy any generation", if the effective copy permission period is designated or the move permission period is designated as necessary, information is recorded temporarily on the medium while keeping "copy one generation" unchanged. In case the control information is "no more copies", copying is inhibited as a rule and therefore, the output of, for example, the recording signal processing circuit 203 is interrupted. In the case of an apparatus in which the aforementioned move mode is permitted, however, recording of information onto the medium is permitted even for "no more copies" on the premise that a counterpart of the information on the side of the apparatus transmitting that information will be erased. In that case, it is sometimes necessary to transmit, to the apparatus on the recording side, information as to whether the erase operation of the transmitting apparatus is adapted to the move mode. Instead of detecting the control information inclusive of such information as just mentioned above by means of the information detection circuit 205, that information may be applied externally separately from the video and audio data.

If the aforementioned move permission period is additionally designated, even the apparatus adapted to the move mode is not permitted to do move when the above move permission period runs out or expires.

Even with the detected control information being "copy one generation", in the absence of information such as copy permission period, the control information is changed to "no more copies" by means of the recording signal processing circuit 203 during recording.

Figure 5:
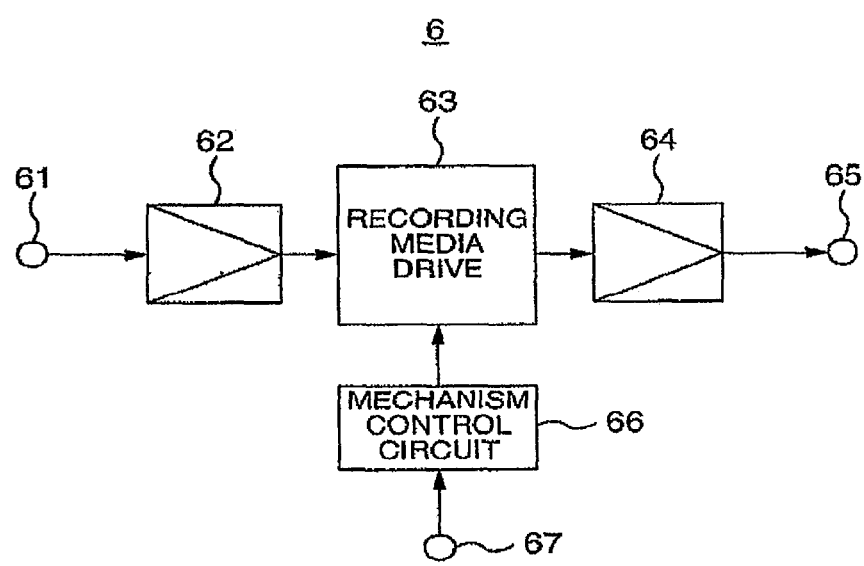
FIG. 5 is a block diagram showing an embodiment of a recording and reproducing unit in the digital information recording apparatus and reproducing apparatus according to the invention.

FIG. 5 is a block diagram showing an embodiment of the recording/reproducing unit 6 shown in FIG. 1. The recording/reproducing unit 6 includes an input terminal 61, a recording amplifier 62, a recording media drive 63 carrying a recording medium such as a hard disc/digital video disc/video tape, a reproducing amplifier 64, an output terminal 65, a mechanism control circuit 66 and an input terminal 67.

The output signal of the recording circuit 2 is supplied to the input terminal 61. This signal is amplified by the recording amplifier 62 so as to be able to drive a laser generation device or a magnetic head and is then recorded on the recording medium as above by means of the recording media drive 63. A signal reproduced from the recording medium is amplified by the reproducing amplifier 64 up to a level that can afford to be processed in the succeeding stage of signal processing and thereafter delivered to the output terminal 65. The mechanism control circuit 66 is for a motor used to drive the recording media drive 63 and is responsive to a control signal inputted to the input terminal 67 to control the recording medium. Though not illustrated, the control signal inputted to the input terminal 67 is fed from the recording circuit 2 or reproducing circuit 1.

Figure 6:
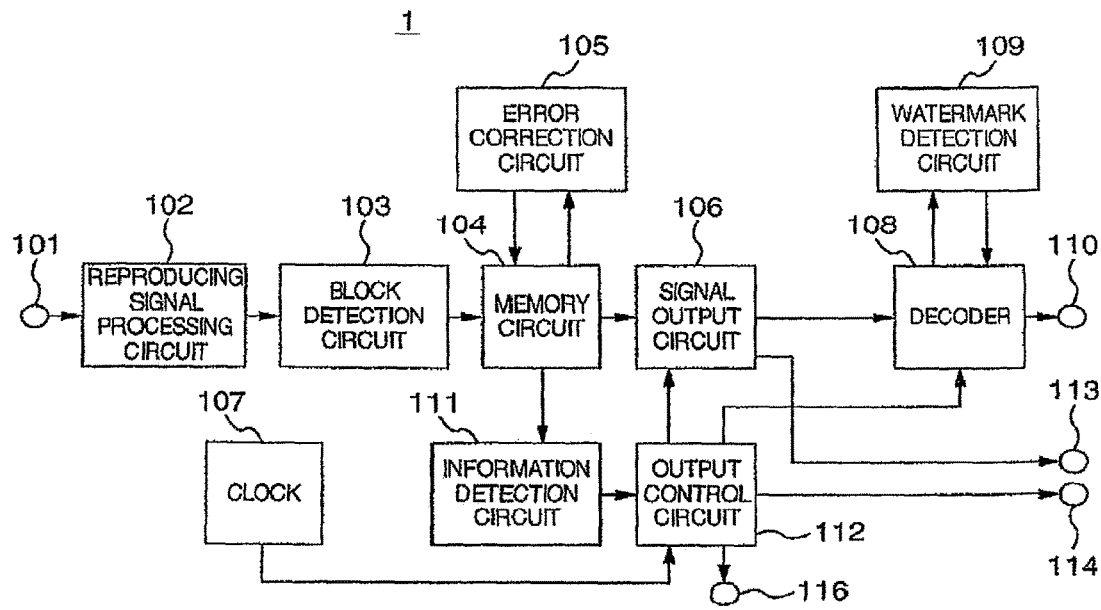
FIG. 6 is a block diagram showing an embodiment of a reproducing circuit in the digital information reproducing apparatus according to the invention.

FIG. 6 is a block diagram showing an embodiment of the recording circuit 1 of the information reproducing apparatus according to the invention. The reproducing circuit 1 includes an input terminal 101 for a reproduction signal, a reproducing signal processing circuit 102, a block detection circuit 103, a memory circuit 104 such as a semiconductor memory, an error correction circuit 105, a signal output circuit 106, a clock 107, a decoder 108 for decoding moving picture compression, a watermark detection circuit 109 for decryption of a watermark embedded in an image, an output terminal 110 for sending a signal to the display, an information detection circuit 111 for control signals, an output control circuit 112 for deciding, on the basis of a control signal, whether delivery of a reproduction signal is permissible, an output terminal 113 for the signal kept away from decoding of the cipher, an output terminal 114 for a decision result, and an output terminal 116 for the control information delivered to the input terminal 208 of recording circuit 2.

The following description will be given by way of a case in which data concerning the aforementioned retention period and playback permission period are included in the reproduction signal supplied to the input terminal 101. The signal is fed to the reproducing signal processing circuit 102. In this circuit, the modulation applied on the recording side for the purpose of performing recording/reproduction on/from the medium is demodulated, the waveform equalization is carried out and data is settled by a clock. Subsequently, in the block detection circuit 103, synchronization and ID signals are detected, on the basis of these signals, reproduction data is once stored at a predetermined location in the memory circuit 104. The error correction circuit 105 detects from the stored data a code error generated in the course of recording and reproduction through arithmetic operation to provide a corrected value. Data subject to error correction is sent to the decoder 108 through the signal output circuit 106.

An output of the signal output circuit 106 is also supplied to the output terminal 113 so as to be used for further copying by a different recording device connected to this terminal 113. But in the case of a signal applied with stringent copy limit as described previously, the signal delivered from this output terminal is subject to "copy never" and therefore, copying often fails to fulfill itself. An output of output control circuit 112 to be described later may be supplied to the signal output circuit 106 to prevent the signal from being delivered to the output terminal 113.

On the other hand, from the data applied with the previous error correction, the information detection circuit 111 for control signal detects data indicative of the retention period and playback permission period. One data detection operation per one frame of an image suffices to provide sufficient information as will be described later and the data may be set to the header of a recording track in the case of, for example, a tape medium. Alternatively, the data detection operation as above may be once performed at intervals of a predetermined amount of data. If that data is recorded frequently, thinning-out detection operation may be carried out during reproduction. Then, the output control circuit 112 decides, on the basis of the detected retention period and playback permission period as well as playback start time, time for recording and the present time from the clock 107, whether the delivery of reproduction output is permissible, thereby controlling the output to the decoder 108. The information detection circuit 111 may also detect the control signal for "copy never" and "no more copies" in order for the output of the output control circuit 112 to control the signal output circuit 106, thus ensuring that when copying is inhibited, the delivery of the reproduction signal to the output terminal 113 can be prevented.

The output of the output control circuit 112 is also applied to the output terminal 114. This output signal is used when the signal detected by the information detection circuit 111 includes information for conditionally permitting a device connected externally to carry out recording/reproduction, in order to transmit the information to the outside. When it is determined that the retention period has already expired, information indicative of this expiration may be supplied from the output terminal 114 to the aforementioned input terminal 67 of FIG. 5 to stop the recording media drive 63.

The moving image data compression applied in advance of the transmission by the decoder 108 is decoded from the output of the signal output circuit 106 and a resulting signal is fed to the output terminal 110 to permit playback with the display connected to the output terminal 110. As the output from the output terminal 110, an intact decoded digital signal may be delivered or an analog signal converted from the digital signal may be delivered.

When a copyright holder, copy control information and the like are embedded as a watermark in an image, the watermark detection circuit 109 operates to detect the watermark. In place of the signal detected by the information detection circuit 111, the information detected from the watermark may be used to perform a similar control operation.

The clock 107 is of course required of accuracy to some extent. If the clock can easily be altered with malicious intent of the user, then it will not fulfil itself. Further, it is desirable that the clock be controllable in response to time information from, for example, the broadcasting station. The clock may be designed to make the apparatus inoperative when the time is altered intentionally.

Next, in connection with the case in which the reproduction signal applied to the input terminal 101 includes data concerning the aforementioned copy permission period, only operation differing from that described as above will be described. In this case, the information detection circuit 111 for control signal detects data of the copy control information, for example, "copy one generation" and the copy permission period. The output control circuit 112 decides, on the basis of the detected control information and copy permission period as well as recording time and the present time from the clock 107, whether copying is permissible and sends a decision result to the signal output circuit 106. If the copy information "copy one generation" is available within the copy permission period, the signal output circuit 106 passes the reproduction signal. On the medium of the external device for preparation of copies, the control signal is changed to "no more copies". If the copy information "copy one generation" is outside the copy permission period, the control information can be rewritten to "no more copies" to disable the external device to copy. As necessary, the information in the medium may be rewritten to "no more copies" by means of the recording circuit. Obviously, rewrite on the reproducing side by the signal output circuit 106 is not limitative and it may be done with another reproducing circuit block.

Figure 7:
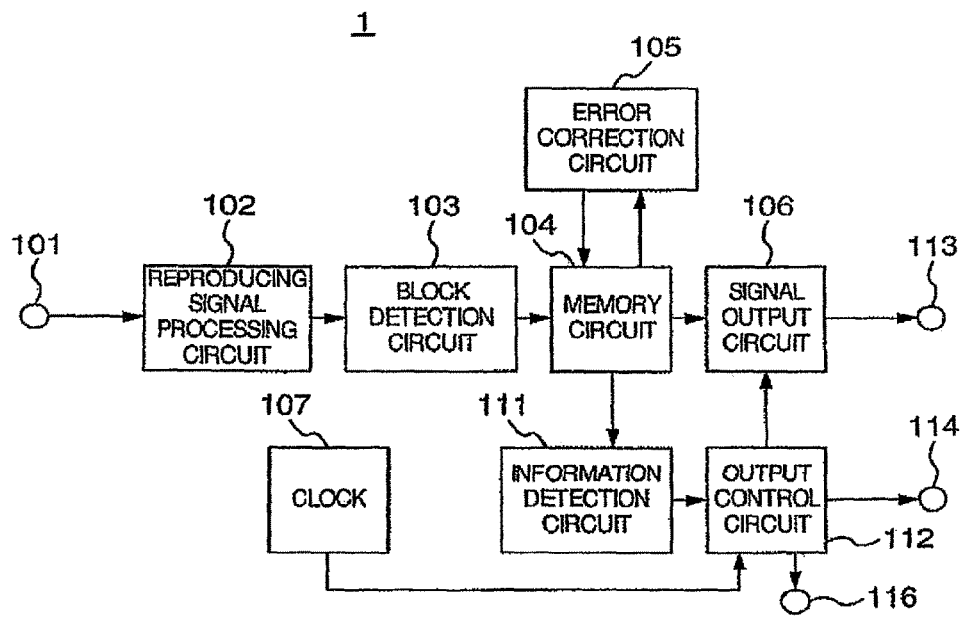
FIG. 7 is a block diagram showing another embodiment of the reproducing circuit in the digital information reproducing apparatus according to the invention.

FIG. 7 is a block diagram showing another embodiment of the reproducing circuit according to the invention. Constituent components identical to those in the FIG. 6 embodiment are designated by identical reference numerals. The present embodiment differs from the FIG. 6 embodiment in that the decoder 108, watermark detection circuit 109 and output terminal 110 are removed. These components are often built in the display 7 of FIG. 1 and in that case, the reproducing circuit is separated as a unitary circuit, leading to the construction shown in FIG. 7. On the basis of the information, such as retention period, playback permission period, copy permission period and copy control information, detected by the information detection circuit 111, the output control circuit 112 sends a control signal to the signal output circuit 106 in order to control permission/inhibition of the delivery of the signal to the outside and rewrite of the control information. The signal at the output terminal 113 can be supplied to the display as well as another external recording device as in the case of the FIG. 6 embodiment.

FIG. 8 is a diagram showing an embodiment of a first control signal transmitted from the information distributor 3 and recorded on the recording medium during recording in the foregoing embodiments. In the case of a tape medium for instance, recording of one first control signal on one recording track suffices but obviously, the first control signal is recorded in a predetermined relationship with video and audio data to assure easy separation of the first control signal during reproduction. Program number 300 indicates what number is allotted to a program in question on the medium. Sector information 301 indicates numbers allotted to sectors set up by dividing the program in a predetermined unit. The division can be made in a fixed unit, for example, in a unit of 2 k bytes or in a constant unit of information, for example, in a unit of division during encoding. The numbers may be set up within the program or may be serial numbers set up throughout the recording medium.

Information such as recording time 305 to be described later is added in a unit of sector. Time information 302 indicates how long the recording part of interest proceeds after start of the program. Type information 303 indicates attribute information of the program as to whether the program is sold, rental, self-made or distributed from broadcasting. Copy control information 304 indicates the aforementioned control information such as "copy never", "copy one generation" or the like.

FIG. 9 shows a structure of the copy control information 304. Version number 311 indicates which version the information belongs to. As will be described later, the copy control information 304 must be so flexible as to add some items other than those shown in FIG. 9 or to erase some items from FIG. 9, as necessary. Accordingly, with a view of determining how what information is arranged in sequence in various ways, the version is managed. For example, when 8 bits are allotted to the version information 311, the copy control information 304 can be used in 256 ways.

Output control 312 controls the permission/inhibition of delivery of the output from the digital output terminal 113 or the analog output terminal 110. For control of the output delivery, it is first decided, from the form of the output and encryption conditions, whether safety can be assured and then the permission/inhibition of the output delivery is controlled. Further, the output delivery permission/inhibition may be controlled depending on resolution for instance. For example, in the case of a video signal of high resolution such as high vision video, control is such that the video signal as it is may be inhibited from being delivered but a video signal set up by degrading the resolution may be permitted for delivery.

Copy control information 313 (CGNS; Copy Generation Management System) controls copying to a digital recording device. For example, when this information is of 2 bits, "11" may designate "copy never", "10" may designate "copy one generation", "01" may designate "no more copies" to the effect that one copy obtained through "copy one generation" is no more permitted for copying, and "00" may designate "copy free". Different CGMS's may be provided for the digital signal output and analog signal output, respectively.

Copy control information 314 (APS; Analog Protection System) controls copying to an analog recording device. A psuedo-sink pulse may be added to an analog video signal for the purpose of controlling permission/inhibition of copying.

Move mode 315 is information concerning permission/inhibition of "move". The term "move" means that information is copied onto a different medium and thereafter, a counterpart of that information recorded on the original medium is erased. This ensures that only one copied information piece can always be allowed to exist, making it possible to keep the condition that many repetitive copying operations result in substantially one copying operation. When information subject to "copy one generation" is copied in the normal copy mode, any more copying is prevented by changing the copy control information to "no more copies" but when the move mode proceeds, the copy control information is again returned to "copy one generation" so that the information of interest can be sent to the copying destination to enable the sent information to be copied and after the copying, the original information is erased. The move mode 315 may prescribe the move permission count in addition to the move permission. In that case, the move permission count information may be decremented each time that a move operation is carried out. For example, when the move mode 315 is of 4 bits, the permission count ranging from 0 to 15 can be defined. In this case, the definition may be such that even when all of the 4 bits are "1111", the count is not 15 but is infinite.

Playback count 316 is for prescribing the playback permission count and is ruled as necessary. The playback count is used when, for example, in addition to a limit set to the effective period by the aforementioned retention period, the playback count is desired to be limited. Like the move permission count, the playback permission count is decremented each time that one playback operation is carried out. When all of the bits are "1" initially, the limitation to the count can be handled as being nullified.

Playback longevity period 317 is used when the playback operation is limited temporally. For example, when the playback longevity period is of 16 bits to ensure management in a unit of minute, temporal limitation up to about 45 days can be available. For all of the bits being "1", this period can also be handled as designating unlimitedness. If the CGMS 313 is "copy never", the rules in the aforementioned playback permission period for instance are predominant in connection with the temporal limitation to the playback operation. Accordingly, the rules in the playback longevity period 317 are used as information available in an instance excepting the above. In an alternative, the playback longevity period 317 may be incorporated into the playback permission period so as to be handled as unified information.

Pause period 318 prescribes a period for permitting a pause operation (temporary stop). The pause period can be handled similarly to the playback longevity period 317. More particularly, it happens that playback operation is required to be stopped temporarily on urgent business due to a visitor. In such a case, the pause period is used to temporally limit the temporary stop.

Delayed start time 319 is used, to limit time for starting working. While the aforementioned retention period sets a limit to working, starting with the recording time, the delayed start time 319 permits working, starting with absolute time such as 12.00 p.m., Jan. 1, 2001 for instance. This is suitable to permit simultaneous disclosures at a time. After the delayed start period has elapsed, information is permitted for playback and delivery for instance. As the delayed start time, the absolute time may be described or a difference time (relative time) from a time (for example, 12.00 p.m., Jan. 1, 1970) agreed by persons in the same line of business may be described. If all of the bits are "0", the recording time may be the start time.

Not all contents of the copy control information 304 are necessary and some of the contents can be omitted. Further, move permissible period 307B to be described later may arranged, for example, between the move mode 315 and the playback count 316, instead of being positioned as shown in FIG. 8.

The recording time 305 in FIG. 8 records, for example, the time of the clock 107 of FIG. 4 or the time supplied from the service information applying circuit 36 of FIG. 2. The recording time 305 can be recorded in a unit of sector for instance.

In the present embodiment, information covering retention period 306A, copy permission period 306B, playback permission period 307A and move permission period 307B is further used. All of the information can be used but only two of 306A and 307A, only two of 306B and 307B or only one of, for example, 306B may sometimes be used.

For the information "copy never", the copyright holder or the software producer rules the retention period 306A and the playback permission period 307A as described previously. For example, the retention period is set to 9 hours and the playback permission period is set to 2 hours. When there is no need of setting a limit to the period, a code of "no limit" may be applied. In addition to the above, limitation to the playback count may be prescribed.

For the information "copy one generation", the copy permission period 306B and move permission period 307B are ruled used similarly and the latter is applied only when needed. Also, limitation to the move permission count may be prescribed.

User identification information 308 is recorded when a code inherent to a user is used with the aim of permitting information recorded on the medium to be reproduced by only the same apparatus as that used during recording or only the user. Encryption information 309 is used to decode a cipher during playback when information is encrypted and recorded on the recording medium. This will be described again later with reference to FIGS. 12 and 13. The information per se has a large amount of data and therefore, code numbers may be recorded and information corresponding to a code number stored in advance may be drawn out by means of the reproducing apparatus so as to be used. The information as above is recorded as necessary at a relatively short temporal pitch, for example, every image frame or at the rate of predetermined amount of data. With the control signal having the structure as above, the present invention can be practiced but the structure shown in FIG. 8 is for explanation only and various kinds of structure, recording position on the medium and frequency can also be applicable.

FIG. 10 is a block diagram showing a structure of a second control signal recorded during reproduction in the present embodiment. The second control information includes playback start time 321, playback start sector number 322 and playback stop sector number 323. The playback start time 321 records a time counted by, for example, the clock 107 of FIG. 12 to be described later. When a playback is stopped, a sector number at that position is recorded in the playback stop sector number 323. Since playback times at sectors on the way can be calculated from the playback start time 321, playback times at all sectors subject to reproduction can be known. Of course, the playback time can be recorded in a unit of sector.

In the case of the tape medium for instance, when the operation mode is returned to the stop mode during playback, individual pieces of control information shown in FIG. 10 can be recorded anywhere near the stop position. The information can also be recorded using, for example, the recording circuit of FIG. 4.

Figure 11:
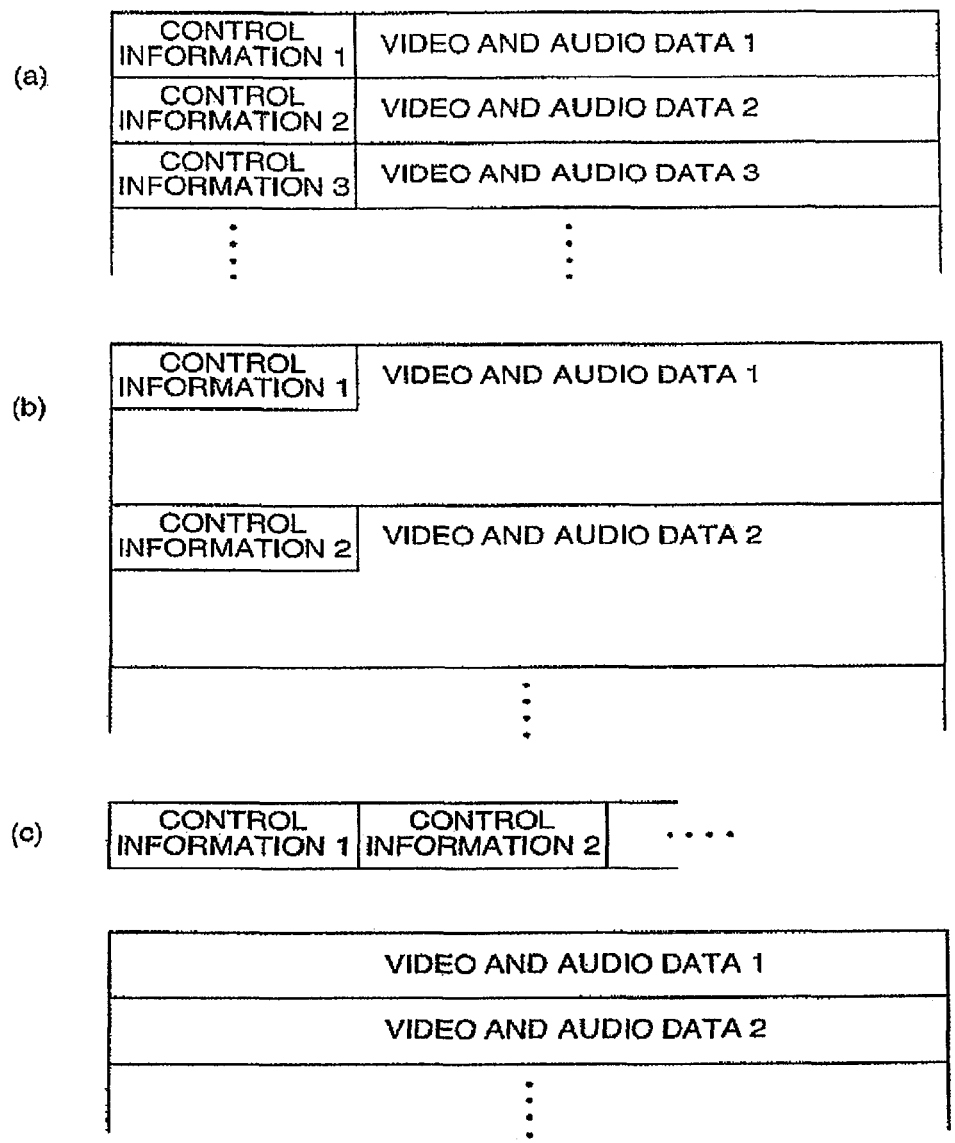
FIG. 11 is a diagram showing an embodiment of recording data on recording medium according to the invention.

Referring to FIG. 11, the recording position of the control signal on the medium will be described. FIG. 11 diagrammatically shows recording positions of the control signal and information data such as video and audio data on the recording medium. Recording positions shown at (a) in FIG. 11 are suitable for the tape medium. In this case, the block of the control signal is preferably provided, for example, every recording track. Accordingly, in each track, a block of the control signal is arranged in the header part, for instance, to precede the information such as video and audio data. Recording positions shown at (b) in FIG. 11 are suitable for a digital video disc. In this case, the control signal and video and audio data are preferably provided every sector having a certain amount of information. Accordingly, they are arranged at the header part every sector. Recording positions shown at (c) in FIG. 11 are suitable for a hard disc. In this case, the information such as video and audio data and the control signal are recorded at positions spaced apart from each other on the disc to permit the whole of the control signal to be read within a short period of time during start. In an alternative, the first control information may be recorded at the header part and the second control information may be recorded at a position spaced apart therefrom. Since the second control information is to be recorded or rewritten during reproduction, it is required to be recorded at an independent or isolated position. Alternatively, instead of being recorded in the recording medium, the second control information may be recorded in, for example, the memory device or memory circuit 104 mounted externally of the recording medium or in a memory device in an independent apparatus.

Figure 12:
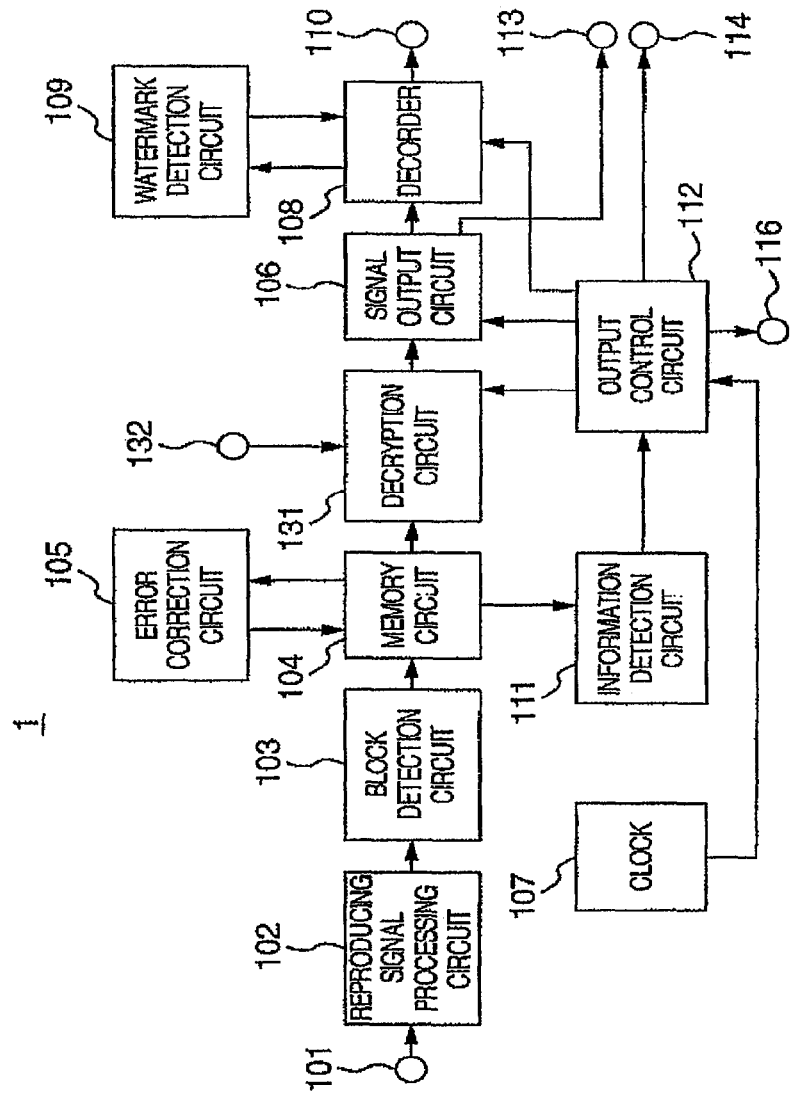
FIG. 12 is a block diagram showing still another embodiment of the reproducing circuit in the digital information reproducing apparatus according to the invention.
Figure 13:
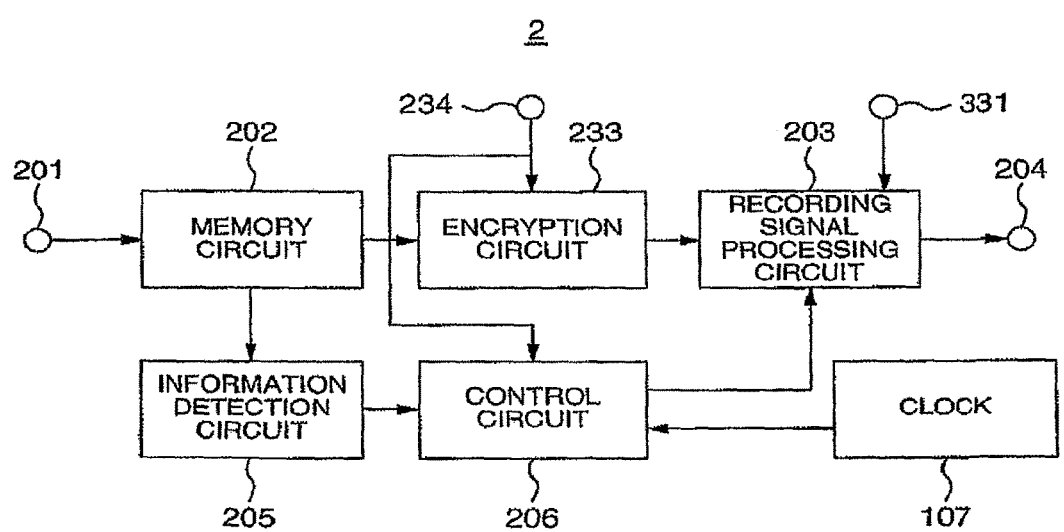
FIG. 13 is a block diagram showing another embodiment of the recording circuit in the digital information recording apparatus according to the invention.

Referring now to FIGS. 12 and 13, another embodiment directed to the reproducing circuit 1 and the recording circuit 2. FIG. 12 is a block diagram showing a reproducing circuit 1 according to the present embodiment and FIG. 13 is a block diagram showing a recording circuit 2 according to the present embodiment. Constituent components identical to those in FIGS. 6 and 4 are designated by identical reference numerals and will not be detailed. The present embodiment is effective when it is required that only predetermined users be allowed to take part in playback or when a fee is charged.

In FIG. 12, there are provided a decryption circuit 131 and an input terminal 132 for an identification code inherent to the apparatus and in FIG. 13, there are provided an encryption circuit 233 and an input terminal 234 for an identification code inherent to the apparatus or an apparatus permitted for playback.

In the encryption circuit 233 of FIG. 13, encryption is carried out with the identification code of the apparatus fed from the input terminal 234. Without performing descramble in the RF tuner 5, two kinds of encryption may be carried out in an overlap fashion. In the decryption circuit 131 of FIG. 12, decryption is carried out with the identification code of the apparatus fed from the input terminal 132. If the identification code is not an authorized one, normal decryption fails to proceed to thereby prevent the playback from being done.

In the apparatus, encryption with the identification code is exemplified but this code may be added to the aforementioned block of the control signal and may be detected on the reproducing side to decide whether the delivery of signal is permissible.

Encryption may be done in a unit of program but when the encryption is carried out while changing the key to the encryption in a unit of sector and individual keys are recorded, an encryption process can be performed in the unit of sector.

Next, an example of operation of controlling the retention period 306A and playback permission period 307A during reproduction will be described. Firstly, when the difference between recording time 305 of a sector to be reproduced and the present time indicated by the clock 107 is within the retention period 306A at the initiation of a playback, the playback is started. At the same time, the playback start time 321 and playback start sector number 322 are recorded as the second control information. With the playback stopped, a playback stop sector number 323 is recorded. With a pause taken, a playback stop sector number 323 is recorded as in the case of the stoppage of the playback and with the pause released, a process similar to that at the initiation of the playback is carried out. More particularly, the time is again confirmed and if the time is within the retention period 306A, playback resumes. When backward feed is done, a playback time at that location is confirmed and if the difference between the playback time and the present time is within the playback permission period 307A, a playback is permitted. When fast feed is carried out, it can be known by confirming the second control information that no playback is carried out throughout a fast feed range. Therefore, when a playback is initiated, permission/inhibition of the playback is decided by only the retention period 306A regardless of the playback permission period 307A. Namely, a playback longevity period after one playback operation subject to the playback permission period 307A is controlled for a playback longevity period following recording subject to the retention period 6A.

The pause period can also be controlled depending on the playback permission period 307A. In this case, permission/inhibition of the initial playback start is controlled by the retention period 306A and when a playback stop is carried out or a pause is taken after start of the playback, the period for stoppage is measured in order that resumption of playback is permitted when the measured period is within the playback permission period 307A but resumption of playback is inhibited when the measured period exceeds the playback permission period 307A. Further, by inhibiting the backward feed, it is possible to steadily permit only one playback operation. In this case, control can be undertaken without recording the second control information.

In case information under the control of the retention period 306A or playback permission period 307A is reproduced and then delivered as a digital signal from the output terminal 113, it is conceivable that the retention period 306A or playback permission period 307A of control information added to the information of interest is decremented or zeroed.

Operation when the copy permission period 306A and move permission period 307B are used is as follows. Firstly, if the difference between a recording time 305 of a sector to be reproduced and the present time indicated by the clock 107 is within the copy permission period 306B at the playback initiation, normal playback is started and a reproduction signal for copying is delivered to the outside. Since the copy control information "copy one generation" remains intact in the signal reproduced and delivered to the outside, recording is permissible for the external device. During recording, however, the copy control information is rewritten to "no more copies" and as a result, any more copying is prevented. In case a playback stop is carried out or a pause is taken after start of the playback, if the copy permission period has already expired at the time that the playback resumes, the copy control information can be changed to, for example, "no more copy" so as to inhibit copying. As far as one copy operation is concerned, the playback may proceed to the end with the copy control information kept to be "copy one generation" and copying may be permitted.

More particularly, a copy longevity period after recording subject to the copy permission period 306B is controlled. After the copy permission period has expired, another recording apparatus is allowed to move information to another medium on the premise that the original information is erased. If expiration of the copy permission period is detected through the aforementioned method at the start of playback, information having its copy control information rewritten to "no more copies" is added with information of move permission period 307B as necessary and then moved to the external recording apparatus. The original information is erased from the medium through a method to be described later. Thereafter, if the difference between the recording time 305 and the present time indicated by the clock 107 is within the move permission period 307B, move between the media is permissible. When the move permission period expires, it is impossible to perform move any more. In the absence of the move permission period 307B, the period for move is unlimited. In other words, the move permission period after the copy permission period has stopped or expired is controlled by the move permission period 307B.

As set forth so far, in copying information to the external recording apparatus within the copy permission period, the copy control information on the original recording medium is changed from "copy one generation" to "no more copies" as the copying operation proceeds. But, the copy control information can be changed at the end of the copy permission period to permit preparation of a plurality of sheets of copy of one generation.

There are some methods of managing the permission/inhibition of delivery of the information to be reproduced (playback, copy or move) in a unit of time. The managing method entangles the method of recording the aforementioned control signal. If the retention period and the playback permission period or copy permission period are managed every image, that is, every frame, the most stringent management can be carried out. The management per frame, however, imposes a large load on operation of hardware, involving a problem of erase to be described later. Accordingly, by managing the control signal in a unit of certain time, the load imposed on processing can be alleviated. For example, a tolerance of one minute is set up for control of the retention period 306A or playback permission period 307A. Then, for a retention period 306A of 120 minutes or a playback permission period 307A of 120 minutes, control is allowed to be done between 120 minutes and 121 minutes and the management can be performed every minute. The tolerance may be set up in a unit of predetermined number of images or in a unit of predetermined amount of data.

The move count and the playback count indicated in connection with FIG. 9 can be managed as will be described below.

In the case of move, the count is decremented by one in essential each time that the move operation is carried out once and a reproduction signal is sent to the external recording apparatus. If, while the number is prescribed, the copy control information signal designates "no more copies", the copy control information can be changed to "copy one generation" and delivered and when recording is carried out with the external recording apparatus, the copy control information can be changed to "no more copies". Further, only when the external recording apparatus is adapted to move from the standpoint of erase operation to be described later, the count can be decremented by one and then delivered. Contrarily, in the case of the apparatus unadapted to move, the count can be rewritten to 0 and then the control signal can be delivered, thus disabling any more move. Obviously, the apparatus on the reproduction signal transmitting side must have the erase function conforming to move as will be described later. A control signal indicative of the erase function may be transmitted to the external recording apparatus.

On the other hand, in the case of the playback count, the manner of management of the playback count matters in the event that, for example, an interruption occurs on the way of playback. A method is available according to which the management is carried out in a unit of contents and after playback has proceeded for a constant time, the count is decremented by one. Alternatively, at the time that a stop, putting a pause aside, is applied, the count may be decremented by one. Further, at the time that backward feed of the medium, putting a stop aside, is applied, the count may be decremented by one.

A description concerning the playback longevity period 317 will be given. When, during playback operation, the playback permission period stops or ends before the program comes to an end, the reproduction output operation can be inhibited but otherwise, delivery of the reproduction output can continue to the end unless the playback operation is stopped. In the latter case, one playback operation can be carried out unless the playback longevity period has already expired at the time that the playback starts. Information for the above purposes can be detected during playback by means of the information detection circuit 111 of FIG. 6. The information can be rewritten by means of, for example, the signal output circuit 106 of FIG. 6. This can further promote the working condition management.

Next, a method of erasing the information on the medium will be described. The term "erase" referred to herein not only signifies erase literally but also involves the case of rewriting at least part of the information on the medium to disable the effective information to be reproduced. Only the aforementioned effective period management in the reproducing circuit is sometimes insufficient to be versatile in the future. If the medium recorded with the information remains, then the reproducing playback will be impossible at present but there is a fear of the future advent of a method that overcomes the present-day preventive method to make playback possible. From the above point of view, the information on the medium is erased after playback or at the termination of the retention period 306A and playback permission period 307A, thus further promoting safety. In addition, when the aforementioned move mode is carried out, the information on the medium must be erased after copying.

Firstly, a unit of information to be erased is considered. It is first conceivable that when the period runs out, an erase operation is carried out in a unit of frame. It is also conceivable that the information is managed in a unit of larger time. For example, the management at the rate of one minute is carried out and information confined within one minute until the expiration is erased collectively. Alternatively, the management is carried out in a unit of plural image frames and information confined within a prescribed time until the expiration may be erased collectively. A similar operation may be undertaken at the rate of predetermined amount of data.

Timing of erase will be considered. As described above, the method is available according to which the erase timing linking to the retention period and playback permission period in some ways is determined. In addition to this, it is conceivable that when information once subjected to playback is not permitted for repetitive playback, the information is erased at a timing of playback even if the playback timing far precedes the effective period. In the event that the medium is removed form the apparatus at the expiration of the period and erase cannot be fulfilled, erase operation may be carried out when the medium is mounted subsequently.

In the case of move, too, it is conceivable that information moved to the next medium is erased in a unit of frame. Alternatively, the information may be managed in a unit of larger time. For example, when the information is managed every minute, information confined within one minute after move may be erased collectively. In an alternative, the information may be managed in a unit of plural image frames and information confined within a prescribed time may be erased collectively. A similar operation may be performed at the rate of predetermined amount of data. Further, after one program has completed copying to the next medium, the whole of the program may be erased collectively.

Next, practical erase operation will be described with reference to the drawings. Erase is made in different ways depending on the type of the medium. An example applied to a disc medium will first be described with reference to FIG. 14.

Figure 14:
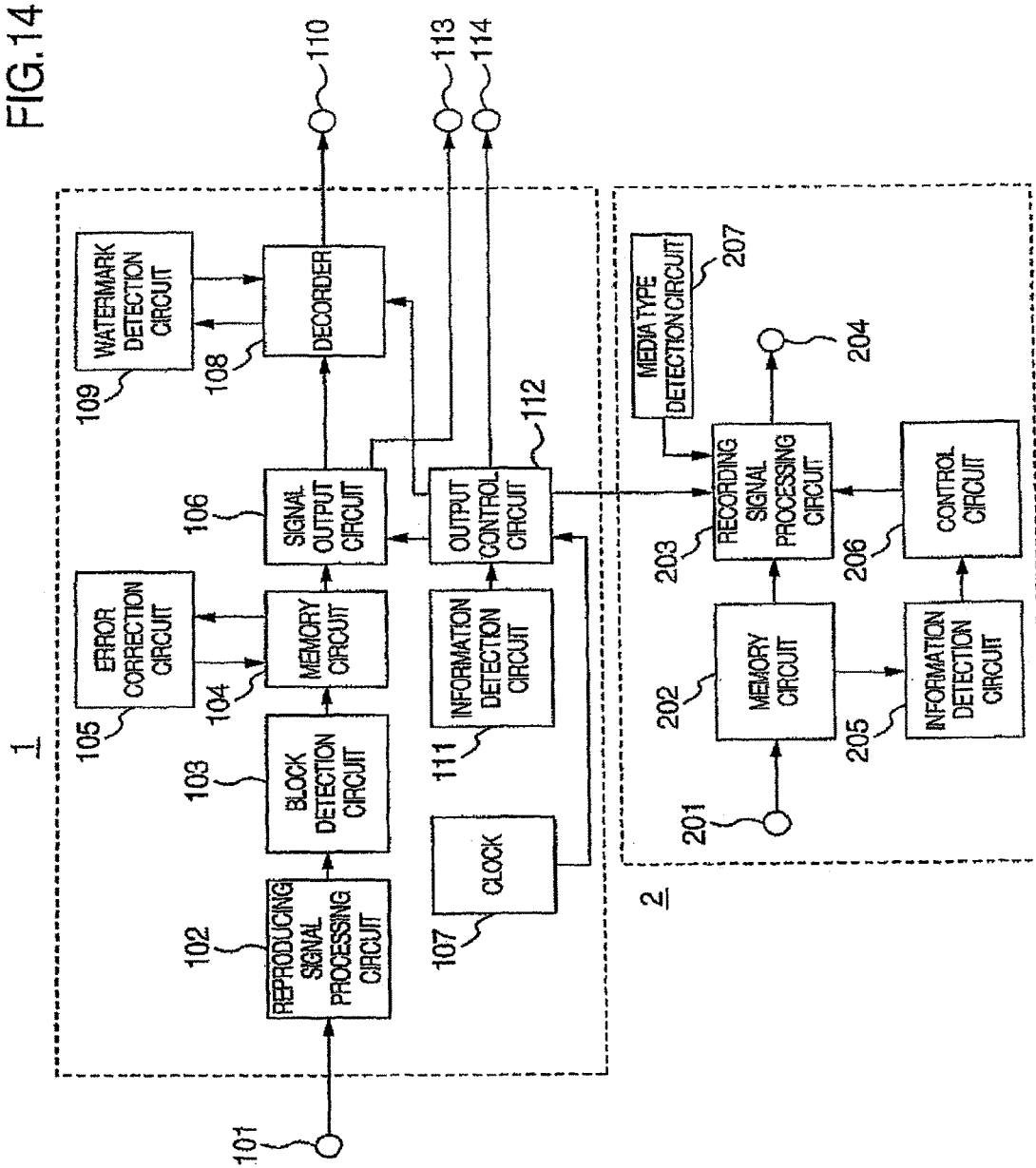
FIG. 14 is a block diagram showing another embodiment of the digital information reproducing apparatus according to the invention.

FIG. 14 is a block diagram showing another embodiment of the information reproducing apparatus according to the invention. In the present embodiment, the block diagram of the reproducing circuit shown in FIG. 6 is unified with the block diagram of the circuit shown in FIG. 4, additionally having a media type detection circuit 207. Obviously, the reproducing circuit construction as shown in FIG. 7 or 12 can be used in place of the FIG. 6 reproducing circuit.

FIG. 14 is adapted to a disc medium. The disc medium is sorted into an RW (or RAM) type capable of rewriting records many times and an R type incapable of rewriting information once recorded. The term "un-rewritable" means "un-erasable" and if erase is to be applied or move is to be carried out after the expiration of the presupposed effective period, recording onto the R type disc medium must be rejected initially. The media type detection circuit 207 is provided for this purpose. Thus, on the premise that the R type disc is carried and erase is made or move is carried out after the expiration of the effective period, a control signal is sent to the recording signal processing circuit 203 to prevent delivery of a code to be recorded. For detection of the medium, some methods have been known which are directed to reading a sign applied outside a recording area of the medium, reading a code precedently recorded at part of the recording area and making a decision on the basis of reflection factor, respectively.

The output of the output control circuit 112 on the reproducing side is also fed to the recording signal processing circuit 203. On the basis of the previously-described retention period and playback permission period or at the time that move proceeds, the output control circuit 112 generates a control signal for commanding an erase operation. Responsive to this control signal, the recording signal processing circuit 203 generates a code for performing erase at a location of interest on the medium. This code can be a code that is meaningless as information. As described previously, the method is available which manages data in a unit of frame and erases the whole of data. This method is, however, sometimes unpractical from the viewpoint of the time for processing. Even in the case of the management in a unit of frame, the object can be attained sufficiently by erasing only the control signal part as shown in FIG. 8 for instance or especially erasing only the encryption information 309 in the control signal part.

This holds true for the management in a unit of other than the frame, for example, for the management in a unit of time, in a unit of group of images or in a unit of prescribed amount of data. For example, when the information is managed in a unit of minute, data confined within one minute until the expiration of the effective period or a control signal of data within one minute after move can be erased. In case encrypted information is recorded, a method is available which erases only scramble information.

Further, in case the control signal in the unit to be managed is, for example, encrypted, the scramble information is recorded collectively at a single location on the medium. This information is reproduced collectively during reproduction inclusive of move, stored at a specified location in the memory circuit 104 and erased from the medium. If the reproduction is stopped on the way, an operation for recording again a control signal for a portion not played back onto the medium is carried out to simplify the erase process. In this case, for the sake of preventing the control signal from being collapsed owing to power failure on the way, the whole or at least part of the area for storage of the information in the memory circuit 104 may preferably be implemented with a non-volatile memory circuit such as a flash memory. Especially, in the case of move, the whole of the program may be erased collectively through the method as above after the move operation has stopped.

Obviously, a unit dedicated to reproduction such as a CD-ROM drive does not have the recording circuit block corresponding to the lower half in FIG. 14 but if having a component corresponding to the recording signal processing circuit 203 having the function of generating the code for erase, it can operate similarly in terms of circuitry. An apparatus using a hard disc as recording medium can of course dispense with the aforementioned media type detection circuit 207.

Next, FIG. 15 is a block diagram showing another embodiment of the information reproducing apparatus according to the invention. In the present embodiment, an erasing device 115 is added to the block diagram of the reproducing circuit shown in FIG. 6. The reproducing circuit construction in FIG. 7 or 12 can of course substitute for the circuit shown in FIG. 6.

The FIG. 15 embodiment is suitable for the tape medium. When the retention period and playback permission period are ruled and a portion once played back cannot be fed backward or when move is carried out, information on the tape medium is to be erased during reproduction. The erasing device 115 is for this purpose and practically implemented with an erase head. During reproduction, the output control circuit 112 sends a control signal to the erasing device 115 to decide whether an erase operation is performed. For example, when the retention period and playback permission period are prescribed, an erase operation is sometimes carried out following reproduction. As the erasing device 115, a full erase head fixed to a tape running mechanism, a flying erase head carried on the rotary drum also carrying the video head or another video head not used as reproducing head in the playback mode as described in JP-A-7-244924.

If the full erase head is used, it must be mounted to a position for erase after scanning of the video head in contrast to the normal position. If the flying erase head or an unused video head is used as the erasing device, it must also be mounted to a position succeeding the reproducing head in the course of tape scanning. In the latter case, if the mount position satisfies the above condition accidentally but if not so, the height must be changed. Even in the former case, it is necessary to change the height or to mount another head.

In any methods, the information to be recorded is digital information and differing from analog information, any problem in quality does not arise when erase is carried out using a DC magnetic field without using an AC magnetic field. Practically, when erase is carried out while performing reproduction, interference due to magnetic induction from the erase head to the reproducing head is difficult to prevent. But this problem can be solved using DC. Conceivably, the erasing device can be constructed of a permanent magnet. But, a mechanism is needed which moves the location when the erase operation is not done and besides tension applied to the tape changes depending on whether or not erase is carried out, thereby raising a problem that the mechanism is difficult to control. In such an event, the aforementioned head may preferably be used as an electromagnet.

As described above, according to the invention, the information to which a stringent copy limit is set can be recorded temporarily by prescribing the retention period and playback permission period. Further, since the playback period is limited, the copyright holders can protect their right. In other words, compatibility between profits of the user and the copyright holder can be met. Further, by erasing the information when the period expires, security against unauthorized copying can be assured to advantage. In addition, the information can be erased collectively in a unit of time or data amount or only specified part of the recording information can be erased to simplify the erase process to advantage.

Furthermore, even the information subject to copy limitation of "copy one generation" can be limited temporally by prescribing the copy permission period and therefore, uneasiness of the copyright holders caused by keeping "copy one generation" intact for a long time can be eliminated. Even when the control information changes to "no more copies", by introducing the move mode on the premise that the information on the original medium is erased, the user can conveniently exchange the medium even under the condition that the medium used for copying is only one. As necessary, the move permission period can advantageously be limited.

Furthermore, by erasing the information collectively in a unit of time or amount of data or erasing specified part of the recording information, the erase process can advantageously be simplified. In addition, by limiting the move count, playback count and playback longevity period, the management of working conditions can further be promoted.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and range of equivalency of the claims are therefore intended to be embraced therein.

What is claimed is:

1. A reproducing system, comprising:
a receiver configured to receive an audio/video information encrypted according to a predetermined encryption method and control information related to the audio/video information, the control information for controlling reproduction of the audio/video information after distribution and at a location different from a distribution location;
a memory configured to at least temporarily store at least a portion of the audio/video information and at least a portion of the control information;
a detector configured to detect at least a portion of the control information, including data indicative of a first period for enabling a reproduction of the audio/video information and disabling reproduction after expiration of a prescribed time and a second period, that begins at a start of an initial reproduction of the audio/video information within the first period and is shorter than the first period, for enabling a reproduction of the audio/video information and disabling reproduction after expiration of a prescribed time following the start of the initial reproduction of the audio/video information;
a decryptor configured to decrypt the audio/video information encrypted according to the predetermined encryption method;
a reproducer configured to reproduce at least a portion of the audio/video information from the memory consistent with restrictions associated with the first period and the second period through decryption by the decryptor; and
a controller configured to control at least the reproducer,
wherein, in a case where the controller confirms that an elapsed time from a start of the first period is within the first period and an elapsed time from a start of an initial reproduction of the audio/video information is within the second period, the controller is configured to, based on at least a portion of the control information detected by the detector, allow the reproducer to reproduce the audio/video information,
wherein, in a case where the controller confirms that a reproduction of the audio/video information is started before an end of the first period and the reproduction is continuing at the end of the first period, the controller is configured to, based on at least a portion of the control information detected by the detector, allow the reproducer to reproduce the audio/video information to an end of the audio/video information beyond the end of the first period and thereafter not allow the reproducer to start an another reproduction of the audio/video information even if an elapsed time from a start of an initial reproduction of the audio/video information is within the second period.

2. The reproducing system according to claim 1, wherein the audio/video information is embedded with at least a portion of the control information.

3. The reproducing system according to claim 1, wherein the control information is embedded as a watermark in the audio/video information.

4. The reproducing system according to claim 1, wherein the control information includes data indicative of user identification information for permitting a specified user to reproduce the audio/video information.

5. The reproducing system according to claim 1, wherein the reproduction to the end of the audio/video information beyond the end of the first period is enabled if the reproduction is not stopped.

6. The reproducing system according to claim 1, wherein the memory is configured to keep storing the audio/video information after the end of the first period, and a start of a reproduction is disabled after the end of the first period.

7. A reproducing system, comprising:
a receiver configured to receive an audio/video information which is encrypted according to a predetermined encryption method and is restricted from reproduction based on at least a portion of control information, including data indicative of a first period for enabling a reproduction of the audio/video information and disabling reproduction after expiration of a prescribed time and a second period, that begins at a start of an initial reproduction of the audio/video information within the first period and is shorter than the first period, for enabling a reproduction of the audio/video information and disabling reproduction after expiration of a prescribed time following the start of the initial reproduction of the audio/video information;

a decryptor configured to decrypt the audio/video information encrypted according to the predetermined encryption method and received by the receiver;

a reproducer configured to reproduce at least a portion of the audio/video information consistent with restrictions associated with the first period and the second period through decryption by the decryptor; and a controller configured to control at least the reproducer, wherein, in a case where the controller confirms that an elapsed time from a start of the first period is within the first period and an elapsed time from a start of an initial reproduction of the audio/video information is within the second period, the controller is configured to, based on at least a portion of the control information, allow the reproducer to reproduce the audio/video information, wherein, in a case where the controller confirms that a reproduction of the audio/video information is started before an end of the first period and the reproduction is continuing at the end of the first period, the controller is configured to, based on at least a portion of the control information, allow the reproducer to reproduce the audio/video information to an end of the audio/video information beyond the end of the first period and thereafter not allow the reproducer to start an another reproduction of the audio/video information even if an elapsed time from a start of an initial reproduction of the audio/video information is within the second period.

8. The reproducing system according to claim 7,
wherein the control information includes data indicative of user identification information for permitting a specified user to reproduce the audio/video information.

9. The reproducing system according to claim 7,
wherein the reproduction to the end of the audio/video information beyond the end of the first period is enabled if the reproduction is not stopped.

10. A transmitting system, comprising:
a receiver configured to receive a request of a user;
a transmitter configured to transmit an audio/video information to an external reproducing system in response to the request of the user, wherein the audio/video information is encrypted according to a predetermined encryption method and is restricted from reproduction based on at least a portion of control information, including data indicative of a first period for enabling a reproduction of the audio/video information and disabling reproduction after expiration of a prescribed time and a second period, that begins at a start of an initial reproduction of the audio/video information within the first period and is shorter than the first period, for enabling a reproduction of the audio/video information and disabling reproduction after expiration of a prescribed time following the start of the initial reproduction of the audio/video information;

wherein at least a portion of the control information is for controlling a reproduction of the external reproducing system, in a case where an elapsed time from a start of the first period is within the first period and an elapsed time from a start of an initial reproduction of the audio/video information is within the second period, to allow the reproduction of the audio/video information by the external reproducing system, and, in a case where a reproduction of the audio/video information by the external reproducing system is started before an end of the first period and the reproduction is continuing at the end of the first period, to allow the reproduction to an end of the audio/video information beyond the end of the first period and thereafter not allow a start of an another reproduction of the audio/video information even if an elapsed time from a start of an initial reproduction of the audio/video information is within the second period.

11. The transmitting system according to claim 10,
wherein the transmitter is configured to transmit the audio/video information with at least a portion of the control information related to the audio/video information to the external reproducing system.

12. The transmitting system according to claim 11,
wherein at least a portion of the control information to be transmitted by the transmitter is embedded as a watermark in the encrypted audio/video information.

13. The transmitting system according to claim 10,
wherein the control information includes data indicative of user identification information for permitting a specified user to reproduce the audio/video information.

14. The transmitting system according to claim 10,
wherein, in a case that the audio/video information is reproduced once by the external reproducing system and thereafter moved to another external reproducing system, a reproduction of the audio/video information moved to the other external reproducing system is restricted based on a period which is decremented from at least one of the first period or the second period.

15. The transmitting system according to claim 10, further comprising
an encryptor configured to encrypt the audio/video information in advance of transmitting to the external reproducing system.

16. A reproducing system, comprising:
a receiving means for receiving an audio/video information encrypted according to a predetermined encryption method and control information related to the audio/video information, the control information for controlling reproduction of the audio/video information after distribution and at a location different from a distribution location;

a storing means for at least temporarily storing at least a portion of the audio/video information and at least a portion of the control information;

a detecting means for detecting at least a portion of the control information, including data indicative of a first period for enabling a reproduction of the audio/video information and disabling reproduction after expiration of a prescribed time and a second period, that begins at a start of an initial reproduction of the audio/video information within the first period and is shorter than the first period, for enabling a reproduction of the audio/video information and disabling reproduction after expiration of a prescribed time following the start of the initial reproduction of the audio/video information;

a decrypting means for decrypting the audio/video information encrypted according to the predetermined encryption method;

a reproducing means for reproducing at least a portion of the audio/video information from the memory consistent with restrictions associated with the first period and the second period through decryption by the decrypting means; and
a controlling means for controlling at least the reproducer,
wherein, in a case where the controlling means confirms that an elapsed time from a start of the first period is within the first period and an elapsed time from a start of an initial reproduction of the audio/video information is within the second period, the controlling means is configured to, based on at least a portion of the control information detected by the detecting means, allow the reproducing means to reproduce the audio/video information,
wherein, in a case where the controlling means confirms that a reproduction of the audio/video information is started before an end of the first period and the reproduction is continuing at the end of the first period, the controlling means is configured to, based on at least a portion of the control information detected by the detecting means, allow the reproducing means to reproduce the audio/video information to an end of the audio/video information beyond the end of the first period and thereafter not allow the reproducing means to start an another reproduction of the audio/video information even if an elapsed time from a start of an initial reproduction of the audio/video information is within the second period.

17. The reproducing system according to claim 16, wherein the audio/video information is embedded with at least a portion of the control information.

18. The reproducing system according to claim 16, wherein the control information is embedded as a watermark in the audio/video information.

19. The reproducing system according to claim 16, wherein the control information includes data indicative of user identification information for permitting a specified user to reproduce the audio/video information.

20. The reproducing system according to claim 16, wherein the reproduction to the end of the audio/video information beyond the end of the first period is enabled if the reproduction is not stopped.

21. The reproducing system according to claim 16, wherein the storing means keeps storing the audio/video information after the end of the first period, and a start of a reproduction is disabled after the end of the first period.

22. A reproducing system, comprising:
a receiving means for receiving an audio/video information which is encrypted according to a predetermined encryption method and is restricted from reproduction based on at least a portion of control information, including data indicative of a first period for enabling a reproduction of the audio/video information and disabling reproduction after expiration of a prescribed time and a second period, that begins at a start of an initial reproduction of the audio/video information within the first period and is shorter than the first period, for enabling a reproduction of the audio/video information and disabling reproduction after expiration of a prescribed time following the start of the initial reproduction of the audio/video information;
a decrypting means for decrypting the audio/video information encrypted according to the predetermined encryption method and received by the receiving means;
a reproducing means for reproducing at least a portion of the audio/video information consistent with restrictions associated with the first period and the second period through decryption by the decrypting means; and
a controlling means for controlling at least the reproducing means,
wherein, in a case where the controlling means confirms that an elapsed time from a start of the first period is within the first period and an elapsed time from a start of an initial reproduction of the audio/video information is within the second period, the controlling means is configured to, based on at least a portion of the control information, allow the reproducing means to reproduce the audio/video information,
wherein, in a case where the controlling means confirms that a reproduction of the audio/video information is started before an end of the first period and the reproduction is continuing at the end of the first period, the controlling means is configured to, based on at least a portion of the control information, allow the reproducing means to reproduce the audio/video information to an end of the audio/video information beyond the end of the first period and thereafter not allow the reproducing means to start an another reproduction of the audio/video information even if an elapsed time from a start of an initial reproduction of the audio/video information is within the second period.

23. The reproducing system according to claim 22, wherein the control information includes data indicative of user identification information for permitting a specified user to reproduce the audio/video information.

24. The reproducing system according to claim 22, wherein the reproduction to the end of the audio/video information beyond the end of the first period is enabled if the reproduction is not stopped.

25. A transmitting system, comprising:
a receiving means for receiving a request of a user;
a transmitting means for transmitting an audio/video information to an external reproducing system in response to the request of the user, wherein the audio/video information is encrypted according to a predetermined encryption method and is restricted from reproduction based on at least a portion of control information, including data indicative of a first period for enabling a reproduction of the audio/video information and disabling reproduction after expiration of a prescribed time and a second period, that begins at a start of an initial reproduction of the audio/video information within the first period and is shorter than the first period, for enabling a reproduction of the audio/video information and disabling reproduction after expiration of a prescribed time following the start of the initial reproduction of the audio/video information;
wherein at least a portion of the control information is for controlling a reproduction of the external reproducing system, in a case where an elapsed time from a start of the first period is within the first period and an elapsed time from a start of an initial reproduction of the audio/video information is within the second period, to allow the reproduction of the audio/video information by the external reproducing system, and, in a case where a reproduction of the audio/video information by the external reproducing system is started before an end of the first period and the reproduction is continuing at the end of the first period, to allow the reproduction to an end of the audio/video information beyond the end of the first period and thereafter not allow a start of an another reproduction of the audio/video information even if an elapsed time from a start of an initial reproduction of the audio/video information is within the second period.

26. The transmitting system according to claim 25, wherein the transmitting means is configured to transmit the audio/video information with at least a portion of the control information related to the audio/video information to the external reproducing system.

27. The transmitting system according to claim 25, wherein at least a portion of the control information to be transmitted by the transmitter is embedded as a watermark in the encrypted audio/video information.

28. The transmitting system according to claim 25, wherein the control information includes data indicative of user identification information for permitting a specified user to reproduce the audio/video information.

29. The transmitting system according to claim 25, wherein, in a case that the audio/video information is reproduced once by the external reproducing system and thereafter moved to another external reproducing system, a reproduction of the audio/video information moved to the other external reproducing system is restricted based on a period which is decremented from at least one of the first period or the second period.

30. The transmitting system according to claim 25, further comprising
an encrypting means for encrypting the audio/video information in advance of transmitting to the external reproducing system.

31. A method, comprising:
receiving an audio/video information encrypted according to a predetermined encryption method and control information related to the audio/video information by a receiver, the control information for controlling reproduction of the audio/video information after distribution and at a location different from a distribution location;
at least temporarily storing at least a portion of the audio/video information and at least a portion of the control information in a memory;
detecting by a detector at least a portion of the control information, including data indicative of a first period for enabling a reproduction of the audio/video information and disabling reproduction after expiration of a prescribed time and a second period, that begins at a start of an initial reproduction of the audio/video information within the first period and is shorter than the first period, for enabling a reproduction of the audio/video information and disabling reproduction after expiration of a prescribed time following the start of the initial reproduction of the audio/video information;
decrypting the audio/video information encrypted according to the predetermined encryption method by a decryptor;
reproducing by a reproducer at least a portion of the audio/video information from the memory consistent with restrictions associated with the first period and the second period through decryption by the decryptor; and
controlling at least the reproducer by a controller,
wherein, in a case where the controller confirms that an elapsed time from a start of the first period is within the first period and an elapsed time from a start of an initial reproduction of the audio/video information is within the second period, the controller is configured to, based on at least a portion of the control information detected by the detector, allow the reproducer to reproduce the audio/video information,
wherein, in a case where the controller confirms that a reproduction of the audio/video information is started before an end of the first period and the reproduction is continuing at the end of the first period, the controller is configured to, based on at least a portion of the control information detected by the detector, allow the reproducer to reproduce the audio/video information to an end of the audio/video information beyond the end of the first period and thereafter not allow the reproducer to start an another reproduction of the audio/video information even if an elapsed time from a start of an initial reproduction of the audio/video information is within the second period.

32. The method according to claim 31, wherein the audio/video information is embedded with at least a portion of the control information.

33. The method according to claim 31, wherein the control information is embedded as a watermark in the audio/video information.

34. The method according to claim 31, wherein the control information includes data indicative of user identification information for permitting a specified user to reproduce the audio/video information.

35. The method according to claim 31, wherein the reproduction to the end of the audio/video information beyond the end of the first period is enabled if the reproduction is not stopped.

36. The method according to claim 31, wherein the memory is configured to keep storing the audio/video information after the end of the first period, and a start of a reproduction is disabled after the end of the first period.

37. A method, comprising:
receiving by a receiver an audio/video information which is encrypted according to a predetermined encryption method and is restricted from reproduction based on at least a portion of control information, including data indicative of a first period for enabling a reproduction of the audio/video information and disabling reproduction after expiration of a prescribed time and a second period, that begins at a start of an initial reproduction of the audio/video information within the first period and is shorter than the first period, for enabling a reproduction of the audio/video information and disabling reproduction after expiration of a prescribed time following the start of the initial reproduction of the audio/video information;
decrypting by a decryptor the audio/video information encrypted according to the predetermined encryption method and received by the receiver;
reproducing by a reproducer at least a portion of the audio/video information consistent with restrictions associated with the first period and the second period through decryption by the decryptor; and
a controlling at least the reproducer,
wherein, in a case where the controller confirms that an elapsed time from a start of the first period is within the first period and an elapsed time from a start of an initial reproduction of the audio/video information is within the second period, the controller is configured to, based on at least a portion of the control information, allow the reproducer to reproduce the audio/video information, wherein, in a case where the controller confirms that a reproduction of the audio/video information is started before an end of the first period and the reproduction is continuing at the end of the first period, the controller is configured to, based on at least a portion of the control information, allow the reproducer to reproduce the audio/video information to an end of the audio/video information beyond the end of the first period and thereafter not allow the reproducer to start an another reproduction of the audio/video information even if an elapsed time from a start of an initial reproduction of the audio/video information is within the second period.

38. The method according to claim 37,
wherein the control information includes data indicative of user identification information for permitting a specified user to reproduce the audio/video information.

39. The method according to claim 37,
wherein the reproduction to the end of the audio/video information beyond the end of the first period is enabled if the reproduction is not stopped.

40. A method, comprising:
receiving a request of a user by a receiver;
transmitting an audio/video information to an external reproducing system by a transmitter in response to the request of the user, wherein the audio/video information is encrypted according to a predetermined encryption method and is restricted from reproduction based on at least a portion of control information, including data indicative of a first period for enabling a reproduction of the audio/video information and disabling reproduction after expiration of a prescribed time and a second period, that begins at a start of an initial reproduction of the audio/video information within the first period and is shorter than the first period, for enabling a reproduction of the audio/video information and disabling reproduction after expiration of a prescribed time following the start of the initial reproduction of the audio/video information;
wherein at least a portion of the control information is for controlling a reproduction of the external reproducing system, in a case where an elapsed time from a start of the first period is within the first period and an elapsed time from a start of an initial reproduction of the audio/video information is within the second period, to allow the reproduction of the audio/video information by the external reproducing system, and, in a case where a reproduction of the audio/video information by the external reproducing system is started before an end of the first period and the reproduction is continuing at the end of the first period, to allow the reproduction to an end of the audio/video information beyond the end of the first period and thereafter not allow a start of an another reproduction of the audio/video information even if an elapsed time from a start of an initial reproduction of the audio/video information is within the second period.

41. The method according to claim 40,
wherein the transmitter is configured to transmit the audio/video information with at least a portion of the control information related to the audio/video information to the external reproducing system.

42. The method according to claim 40,
wherein at least a portion of the control information to be transmitted by the transmitter is embedded as a watermark in the encrypted audio/video information.

43. The method according to claim 40,
wherein the control information includes data indicative of user identification information for permitting a specified user to reproduce the audio/video information.

44. The method according to claim 40,
wherein, in a case that the audio/video information is reproduced once by the external reproducing system and thereafter moved to another external reproducing system, a reproduction of the audio/video information moved to the other external reproducing system is restricted based on a period which is decremented from at least one of the first period or the second period.

45. The method according to claim 40, further comprising encrypting the audio/video information by a encryptor in advance of transmitting to the external reproducing system.

* * * * *